(12) United States Patent
Ji et al.

(10) Patent No.: US 10,877,689 B2
(45) Date of Patent: Dec. 29, 2020

(54) MEMORY CONTROLLER AND OPERATING METHOD THEREOF

(71) Applicant: SK hynix Inc., Gyeonggi-do (KR)

(72) Inventors: Seung Gu Ji, Seoul (KR); Se Hwa Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/239,785

(22) Filed: Jan. 4, 2019

(65) Prior Publication Data

US 2019/0354311 A1    Nov. 21, 2019

(30) Foreign Application Priority Data

May 15, 2018  (KR) .................. 10-2018-0055388

(51) Int. Cl.
*G06F 3/06*  (2006.01)
*G06F 9/30*  (2018.01)

(52) U.S. Cl.
CPC .......... *G06F 3/0658* (2013.01); *G06F 3/0604* (2013.01); *G06F 3/0652* (2013.01); *G06F 3/0659* (2013.01); *G06F 3/0673* (2013.01); *G06F 9/30101* (2013.01)

(58) Field of Classification Search
None
See application file for complete search history.

(56) References Cited

U.S. PATENT DOCUMENTS

| | | | | |
|---|---|---|---|---|
| 6,058,047 A * | 5/2000 | Kikuchi | .............. | G06F 11/1068 365/185.33 |
| 8,689,082 B2 * | 4/2014 | Oh | .................. | G11C 11/5628 714/773 |
| 9,361,182 B2 * | 6/2016 | Hu | ..................... | G06F 11/1072 |
| 10,108,366 B2 * | 10/2018 | Huang | ................. | G06F 3/0619 |
| 10,310,924 B2 * | 6/2019 | Jei | ......................... | G06F 11/076 |
| 2007/0186065 A1 * | 8/2007 | Lee | ....................... | G06F 3/0674 711/159 |
| 2016/0342458 A1 * | 11/2016 | Cai | ......................... | G11C 16/26 |
| 2017/0277471 A1 | 9/2017 | Huang et al. | | |
| 2017/0329542 A1 * | 11/2017 | Chou | .................... | G06F 3/0619 |
| 2018/0260137 A1 * | 9/2018 | Tsou | .................... | G06F 12/0246 |
| 2019/0391916 A1 * | 12/2019 | Hsieh | ................. | G06F 12/0246 |

FOREIGN PATENT DOCUMENTS

KR    1020170095524    8/2017

\* cited by examiner

*Primary Examiner* — Elias Mamo
(74) *Attorney, Agent, or Firm* — IP & T Group LLP

(57) ABSTRACT

The memory controller includes a register allocator for dividing one super block into a plurality of unit areas, a plurality of first counters each corresponding to a respective one of the plurality of unit areas, wherein each of the plurality of first counters increments a count value when a corresponding unit area is read accessed, a second counter corresponding to the super block, wherein the second counter increments a count value when a count value of any of the first counters reaches a first threshold value, and a command generator for generating a command for performing a read reclaim operation when the count value of the second counter reaches a second threshold value.

18 Claims, 16 Drawing Sheets

MEMORY CONTROLLER AND OPERATING METHOD THEREOF

CROSS-REFERENCE TO RELATED APPLICATION

The present application claims priority under 35 U.S.C. § 119(a) to Korean patent application number 10-2018-0055388, filed on May 15, 2018, which is incorporated herein by reference in its entirety.

BACKGROUND

1. Field of Invention

The present disclosure generally relates to a memory controller and an operating method thereof, and more particularly, to a memory controller for counting a number of accesses to a super block and an operating method of the memory controller.

2. Description of Related Art

A memory system may include a memory device and a memory controller.

The memory device may store data or output stored data under the control of the memory controller. For example, the memory device may be configured as a volatile memory device in which stored data is lost when the supply of power is interrupted, or be configured as a nonvolatile memory device in which stored data is retained even when the supply of power is interrupted.

The memory controller may control data communication between a host and the memory device.

The host may communicate with the memory system by using various interface protocols.

SUMMARY

Embodiments of the present disclosure provide a memory controller for counting an access number of a super block, using a K-bit architecture register, and an operating method of the memory controller.

In accordance with an aspect of the present disclosure, there is provided a method for operating a memory controller, the method including dividing a super block into a plurality of unit areas, allocating N bits, among K bits of a K-bit architecture register, to count a number of read accesses to each of the plurality of unit areas up to a first threshold value, wherein N and K are natural number, and allocating bits, among remaining bits of the K-bit architecture register, to count a number of read accesses to the super block up to a second threshold value, wherein N is determined such that a value obtained by multiplying the first threshold value and the second threshold value represents a target count value.

In accordance with another aspect of the present disclosure, there is provided a memory controller including a first counter group including a plurality of first counters each configured to count, up to a first threshold value, a number of read accesses to a unit area corresponding thereto, among a plurality of unit areas constituting a super block, using N bits, among K bits of a K-bit architecture register, wherein N and K are natural numbers, a second counter configured to count, up to a second threshold value, a number of read accesses to the super block, using remaining bits of the K-bit architecture register, and a register allocator configured to determine N such that a value obtained by multiplying the first threshold value and the second threshold value represents a target count value.

In accordance with still another aspect of the present disclosure, there is provided a memory controller including a register allocator configured to divide one super block into a plurality of unit areas, a plurality of first counters each corresponding to a respective one of the plurality of unit areas, wherein each of the plurality of first counters increments a count value when a corresponding unit area is read accessed, a second counter corresponding to the super block, wherein the second counter increments a count value when a count value of any of the first counters reaches a first threshold value, and a command generator configured to generate a command for performing a read reclaim operation when the count value of the second counter reaches a second threshold value.

In accordance with still another aspect of the present disclosure, there is provided a memory system including a memory device including a plurality of unit areas that define a super block, and a memory controller configured to count a number of read accesses to each of the plurality of unit area, increment a count value each time the total number of read accesses to any of the plurality of unit areas reaches a first threshold value, and generate a command to perform a read reclaim operation when the count value reaches a second threshold value.

BRIEF DESCRIPTION OF THE DRAWINGS

Various embodiments will now be described more fully with reference to the accompanying drawings; however, elements and features of the present invention may be configured or arranged differently than disclosed herein. Thus, the present invention is not limited to the embodiments set forth herein. Rather, these embodiments are provided so that this disclosure is thorough and complete and fully conveys the scope of the embodiments to those skilled in the art to which of the present disclosure pertains.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout. Also, throughout the specification, reference to "an embodiment," "another embodiment" or the like is not necessarily to only one embodiment, and different references to any such phrase are not necessarily to the same embodiment(s).

DETAILED DESCRIPTION

In the following detailed description, embodiments of the present disclosure are illustrated and described by way of example. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed. In addition, when an element is referred to as "including" a component, this indicates that the element may further include one or more other components instead of excluding such component(s), unless the context indicates otherwise.

Various embodiments of the present disclosure will be described with reference to the accompanying drawings.

Figure 1:
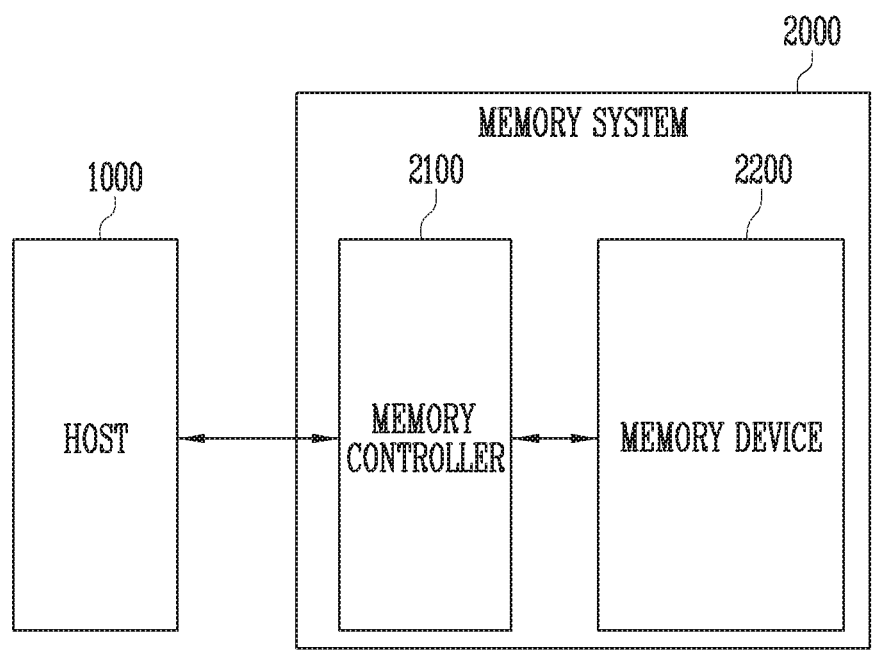
FIG. 1 is a diagram illustrating a memory system in accordance with an embodiment of the present disclosure.

FIG. 1 is a diagram illustrating a memory system 2000 in accordance with an embodiment of the present disclosure.

Referring to FIG. 1, the memory system 2000 may include a memory device 2200 for storing data and a memory controller 2100 for controlling the memory device 2200 in accordance with a request of a host 1000.

The host 1000 may communicate with the memory system 2000 by using any of various interface protocols such as Peripheral Component Interconnect-Express (PCI-e or PCIe), Advanced Technology Attachment (ATA), Serial ATA (SATA), Parallel ATA (PATA), or Serial Attached SCSI (SAS). Interface protocols between the host 1000 and the memory system 2000 are not limited to the above-described examples, and may include various interfaces such as a Universal Serial Bus (USB), a Multi-Media Card (MMC), an Enhanced Small Disk Interface (ESDI), and Integrated Drive Electronics (IDE).

The memory controller 2100 may control overall operations of the memory system 2000, and control data exchange between the host 1000 and the memory device 2200. For example, the memory controller 2100 may translate received information such that a command, an address, and data may be communicated between the host 1000 and the memory device 2200, and store and output the translated information. For example, in a program operation, the memory controller 2100 may transmit a command, an address, data, and the like to the memory device 2200. For example, in a read operation, the memory controller 2100 may transmit a command, an address, and the like to the memory device 2200.

The memory controller 2100 may be implemented with a K-bit (K is a natural number) architecture. That is, the memory controller 2100 may receive, generate or transmit a command, an address, data, and the like in a K-bit unit. When the K-bit architecture is used, the memory controller 2100 may perform various calculations, using a K-bit architecture register. The K-bit architecture register refers to a register having a length of K bits.

The memory controller 2100 may allocate all bits or some bits of the K-bit architecture register to count a target count value indicative of the number of occurrences of an event. For example, the memory controller 2100 may count the number of times a memory block or super block is accessed. The access may be, for example, any one of a program, a read, and an erase operation.

The memory controller 2100 may divide a super block into a plurality of unit areas, and allocate bits of one K-bit architecture register to a super block and a plurality of unit areas constituting the corresponding super block. The memory controller 2100 may count a target count value, using bits allocated to the super block and the plurality of unit areas, and perform an operation, based on the counting result. The operation may be a read reclaim operation. A read reclaim operation may be an operation of re-programming data of a super block of which read number exceeds the target count value in another super block. An operation of the memory controller 2100 will be described in detail later with reference to related drawings.

The memory device 2200 may perform an operation according to a command received from the memory controller 2100. For example, the memory device 2200 may receive a program command, a read command, an erase command, and the like from the memory controller 2100. The memory device 2200 may include a memory cell array (not shown) having a plurality of memory cells organized in regions such as memory blocks. Each memory block may include a plurality of pages. In an embodiment of the present disclosure, the memory device 2200 may be a NAND-type flash memory, however, the present invention is not limited in this way.

Figure 2:
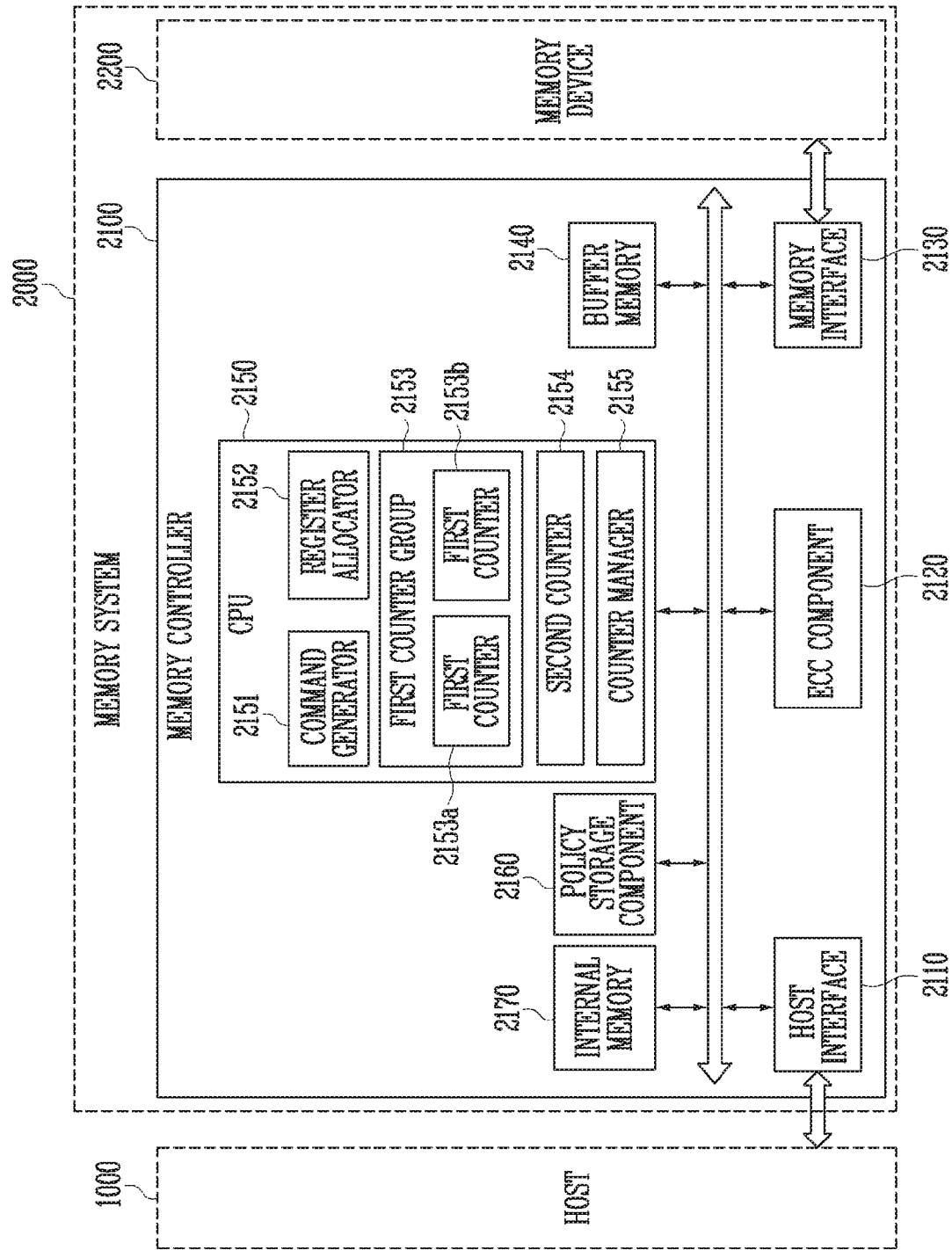
FIG. 2 is a diagram illustrating in detail an exemplary memory controller, such as that shown in FIG. 1.

FIG. 2 is a detailed diagram of the memory controller 2100 shown in FIG. 1.

Referring to FIG. 2, the memory controller 2100 may include a host interface 2110, an error correction code (ECC) component 2120, a memory interface 2130, a buffer memory 2140, a central processing unit (CPU) 2150, a policy storage component 2160, and an internal memory 2170. The CPU 2150 may control the host interface 2110, the ECC component 2120, the memory interface 2130, the buffer memory 2140, the policy storage component 2160, and the internal memory 2170.

The host interface 2110 may exchange data with the host 1000, using a communication protocol.

The ECC component 2120 may perform encoding and decoding for error correction in a program operation or a read operation.

The memory interface 2130 may communicate with the memory device 2200, using a communication protocol.

The buffer memory 2140 may temporarily store data while the memory controller 2100 is controlling the memory device 2200. For example, data received from the host 1000 may be temporarily stored in the buffer memory 2140 until a program operation is completed. Also, data read from the memory device 2200 in a read operation may be temporarily stored in the buffer memory 2140. In some embodiments, the buffer memory 2140 may be disposed externally to the memory controller 2100.

The CPU 2150 may perform various calculations or generate a command and an address so as to control an operation of the memory device 2200.

The CPU 2150 may include a command generator 2151, a register allocator 2152, a first counter group 2153, a second counter 2154, and a counter manager 2155.

The command generator 2151 may generate various commands for a program operation, a read operation, an erase operation, a suspend operation, a copy-back operation, and a read reclaim operation and addresses corresponding to the respective commands.

The register allocator 2152 may divide one super block into a plurality unit areas. The register allocator 2152 may allocate N (N is a natural number) bits among K bits of a K-bit architecture register to correspond to each of the plurality of unit areas constituting the super block. The number of unit areas constituting one super block may be determined by the register allocator 2152 according to a set reference. In an embodiment, information about the number of the unit areas may be received from an external source. The unit area may include at least one memory block among memory blocks constituting a super block. The N bits allocated to each unit area may be used for each of a plurality of first counters 2153a and 2153b in the first counter group 2153 to count up to a first threshold value. Therefore, that the N bits are allocated corresponding to each unit area may mean that the N bits are allocated to each of the first counters 2153a and 2153b such that the first counters 2153a and 2153b corresponding to the respective unit area may count up to the first threshold value. The first threshold value may be a maximum value that can be counted using the N bits, or a value less than the maximum value.

The register allocator 2152 may allocate remaining bits of the K-bit architecture register or some of the remaining bits to correspond to the super block. When the number of unit areas is M (M is a natural number), the remaining bits may have a length of [K−(M×N)]. Therefore, the bits allocated corresponding to the super block may be [K−(M×N)] bits or bits having a number smaller than that of the [K−(M×N)] bits. The bits allocated corresponding to the super block may be used for the second counter 2154 to count a second threshold value. That is, that the remaining bits are allocated corresponding to the super block may mean that the remaining bits are allocated to the second counter 2154 such that the second counter 2154 may count up to the second threshold value. The second threshold value may be a maximum value that can be counted using the remaining bits, or a value less than the maximum value.

When the register allocator 2152 allocates N bits to correspond to each of the plurality of unit areas, the register allocator 2152 may determine N such that the value obtained by multiplying the first threshold value and the second threshold value may represent a target count value. When multiple N values are determined to meet the multiplication condition, the register allocator 2152 may select a largest N among the determined N values. Also, the register allocator 2152 may determine the second threshold value such that the value obtained by multiplying the first threshold value and the second threshold value may represent the target count value. The target count value may be a reference value for a read reclaim operation to be performed.

The first counter group 2153 may include a plurality of first counters 2153a and 2153b. Each of the first counters 2153a and 2153b may be allocated to any one-unit area among a plurality of unit areas constituting one super block. For example, when the number of unit areas constituting one super block is M, the number of first counters 2153a and 2153b may be M. For clarity and convenience of description, only two first counters 2153a and 2153b are illustrated in FIG. 2. The first counters 2153a and 2153b may be implemented in software, and the CPU 2150 may generate first counters 2153a and 2153b to correspond to the number of unit areas constituting one super block. To this end, the CPU 2150 may have an algorithm capable of generating a counter. Each of the first counters 2153a and 2153b may count up to the first threshold value using bits allocated to a unit area corresponding thereto.

Each of the first counters 2153a and 2153b may increase a count value by '1' whenever a corresponding unit area is accessed. For example, each of the first counters 2153a and 2153b may increase a count value by '1' whenever a unit area corresponding thereto is read. To this end, the register allocator 2152 may manage addresses of a super block and a plurality of unit areas. Also, the register allocator 2152 may manage information on which unit area each of the first counters 2153a and 2153b corresponds to. For example, the register allocator 2152 may determine that the first counter 2153a corresponds to a first unit area among the plurality of unit areas, and that the first counter 2153b corresponds to a second unit area among the plurality of unit areas, and such correspondence may be managed by the register allocator 2152. Therefore, the register allocator 2152 may check on which unit area, among the plurality of unit areas, a read operation is performed by checking an address corresponding to a read command generated by the command generator 2151. Also, when a read operation has been performed on a unit area, the register allocator 2152 may notify a first counter (e.g., the first counter 2153a) corresponding to the unit area on which the read operation has been performed that occurrence of the read operation. Accordingly, the first counter (e.g., the first counter 2153a) receiving the notification that the read operation has performed on the unit area corresponding thereto may increase its own count value by '1'.

A first counter (e.g., the first counter 2153a) that reaches a threshold value, among the plurality of first counters 2153a and 2153b belonging to the first counter group 2153, may notify the counter manager 2155 that the first counter has reached the first threshold value. The counter manager 2155 may instruct all of the first counters 2153a and 2153b belonging to the first counter group 2153 to initialize their count values. Accordingly, all of the first counters 2153a and 2153b belonging to the first counter group 2153 may initialize their count values. That is, all of the first counters 2153a and 2153b belonging to the first counter group 2153 may be initialized whenever a count value of any one first counter (e.g., the first counter 2153a) among the plurality of first counters 2153a and 2153b belonging to the first counter group 2153 reaches the first threshold value.

The second counter 2154 may be allocated to correspond to one super block. Like the first counter group 2153, the second counter 2154 may be implemented in software, and be generated by the CPU 2150. The second counter 2154 may increase a count value by '1' whenever a count value of any one counter (e.g., the first counter 2153a) among the plurality of first counters 2153a and 2153b belonging to the first counter group 2153 reaches a threshold value. For example, when a count value of the first counter (e.g., the first counter 2153a) among the plurality of first counters 2153a and 2153b belonging to the first counter group 2153 reaches the first threshold value, the first counter (e.g., the first counter 2153a) may notify the second counter 2154 that the first counter has reached the first threshold value. Accordingly, the second counter 2154 may increase its own count value by '1'. When the count value of the second counter 2154 reaches the second threshold value, the second counter 2154 may notify at least one of the command generator 2151 and the counter manager 2155 that its own count value has reached the second threshold value. Accordingly, the command generator 2151 may generate a command for performing a read reclaim operation, an address, and the like and transmit them to the memory device 2200. The counter manager 2155 may instruct all of the first counters 2153a and 2153b belonging to the first counter group 2153 and the second counter 2154 to initialize their count values.

The register allocator 2152 may check a command and an address, which are generated by the command generator 2151. When an erase command for a super block is generated, the register allocator 2152 may notify the counter manager 2155 of that an erase operation on the super block has been performed. Accordingly, the counter manager 2155 may instruct all of the first counters 2153a and 2153b belonging to the first counter group 2153 and the second counter 2154 to initialize their count values. That is, all of the first counters 2153a and 2153b belonging to the first counter group 2153 and the second counter 2154 may be initialized whenever the super block is erased.

The register allocator 2152 may adjust numbers of bits allocated corresponding to a super block and each of unit areas constituting the corresponding super block, based on a policy that defines a target count value corresponding to an erase number of the super block. That is, the register allocator 2152 may determine N such that the value obtained by multiplying the first threshold value and the second threshold value may represent the target count value corresponding to the erase number of the super block, which is defined by the policy. For example, when the erase number of the super block increases, the register allocator 2152 may increase the number of bits allocated corresponding to the unit area, and decrease the number of bits allocated corresponding to the super bock. In other words, as the erase number of the super block increases, the first threshold value may increase, and the second threshold value may decrease.

The register allocator 2152 may determine a number of unit areas according to whether the super block is a super block for storing random data (random block) or a super block for storing sequential data (sequential block). That is, the register allocator 2152 may divide the super block into different numbers of unit areas according to whether the super block stores random data or sequential data. For example, the register allocator 2152 may determine the number of unit areas constituting the random block to be larger than that of unit areas constituting the sequential block. The sequential data may be, for example, data recorded throughout a plurality of memory blocks (e.g., data that constitutes a high-capacity file). The random data may be, for example, data recorded in one memory block (e.g., data that constitutes a low-capacity file). To this end, the register allocator 2152 may manage information on whether a super block is a random block or a sequential block. For example, when a program operation is performed on the super block, the register allocator 2152 may check whether sequential data or random data is stored, and manage the information determined from the check. For example, the register allocator 2152 may check a program command generated by the command generator 2151 and an address corresponding to the corresponding program command, and check how many memory blocks one program operation is performed on. When it is determined that one program operation is performed on one memory block, the register allocator 2152 may manage, as a random block, a super block including the memory block on which the corresponding program operation is performed. When it is determined that one program operation is performed on a plurality of memory blocks, the register allocator 2152 may manage, as a sequential block, a super block including the plurality of memory blocks on which the corresponding program operation is performed. Therefore, the register allocator 2152 may determine how many unit areas the corresponding super block is to be divided into, with reference to information managed corresponding to the super block.

The policy storage component 2160 may store a policy that defines a target count value corresponding to an erase number of a super block.

The internal memory 2170 may be used as a storage for storing various information required to operate the memory controller 2100. The internal memory 2170 may include a map table. For example, physical-to-logical address information and logical-to-physical address information may be stored in the map table.

Figure 3:
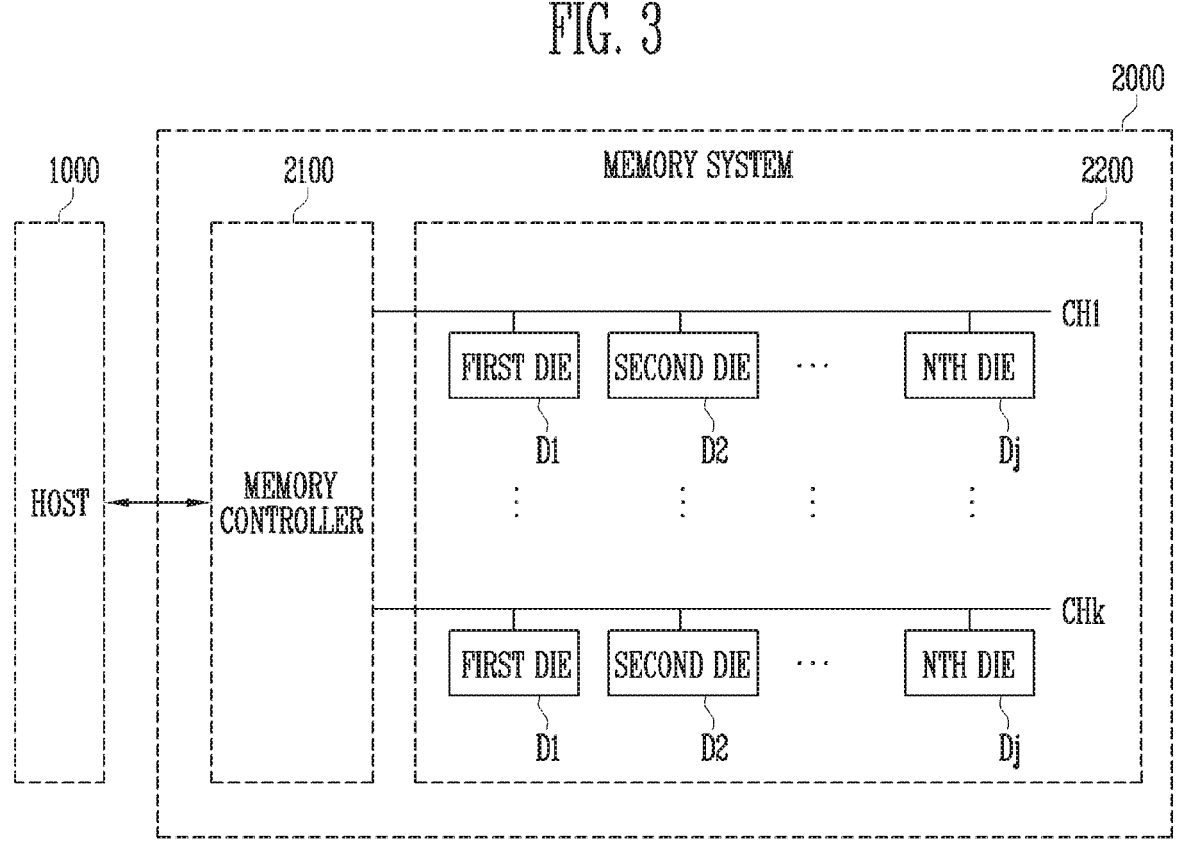
FIG. 3 is a diagram illustrating in detail an exemplary memory device, such as that shown in FIG. 1.

FIG. 3 is a detailed diagram of the memory device 2200 shown in FIG. 1.

The memory controller 2100 may have the same configuration as the memory controller 2100 described with reference to FIGS. 1 and 2, and perform the same operation.

In the embodiment described with reference to FIG. 3, content common to arrangement described with reference to FIGS. 1 and 2 is omitted here.

Referring to FIG. 3, the memory controller 2100 may be coupled to the memory device 2200 through a plurality of channels CH1, . . . , and CHk. The memory device 2200 may include a plurality of dies D1 to Dj (j is a positive integer). The plurality of dies D1 to Dj may communicate with the memory controller 2100 through the plurality of channels CH1, . . . , and CHk. For example, a plurality of dies D1 to Dj may be coupled to each of the channels CH1 to CHk. Dies coupled to different channels may operate independently from each other. For example, a die D1 coupled to the channel CH1 and a die D1 coupled to the channel CHk may operate at the same time.

Figure 4:
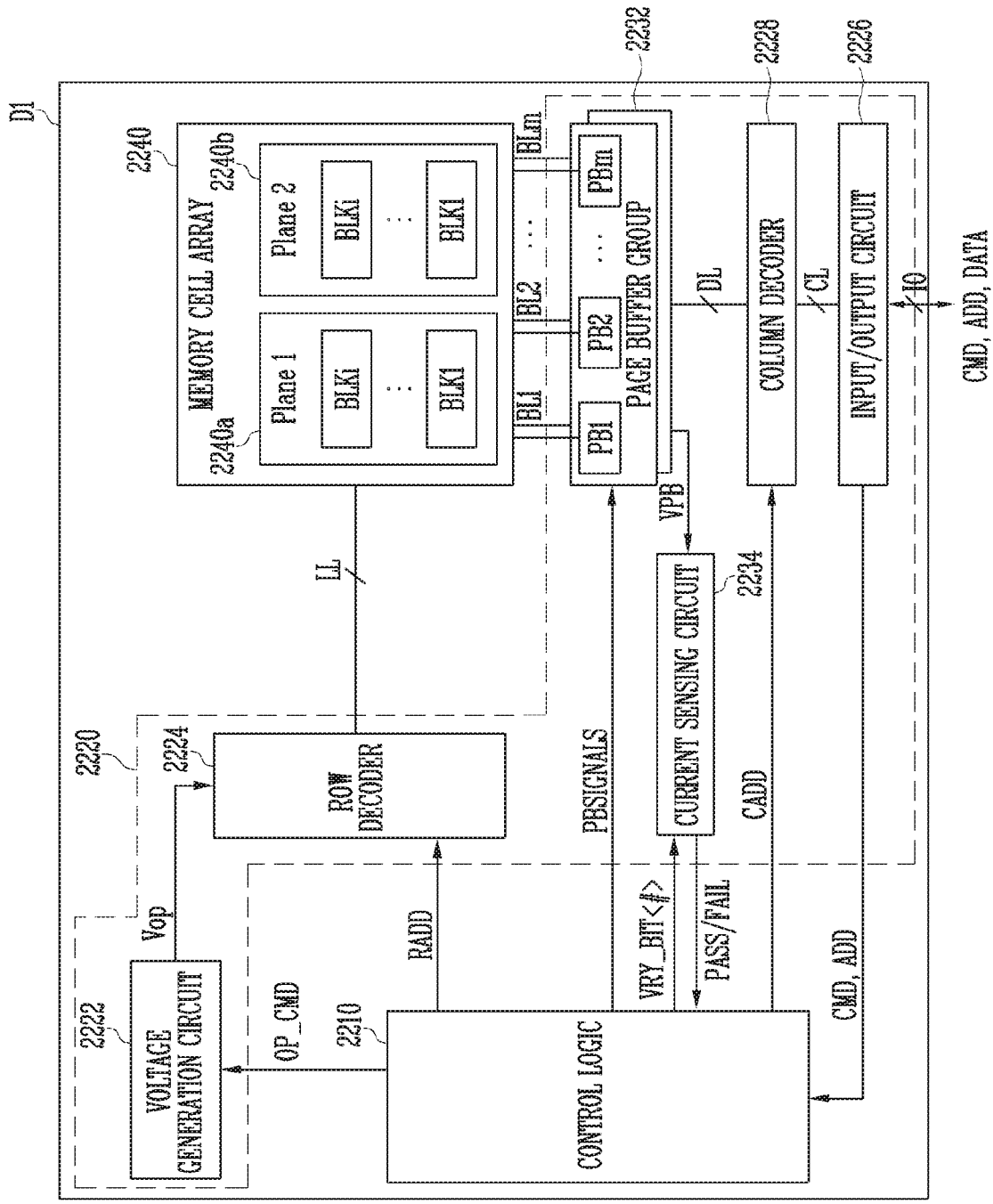
FIG. 4 is a diagram illustrating an exemplary die, such as that shown in FIG. 3.

FIG. 4 is a diagram illustrating the die shown in FIG. 3. The dies D1 to Dj shown in FIG. 3 may be configured identically to one another, and therefore, any one die D1 among the dies D1 to Dj will be described as an example.

Referring to FIG. 4, the die D1 may include control logic 2210, a peripheral circuit 2220, and a memory cell array 2240. The peripheral circuit 2220 may include a voltage generation circuit 2222, a row decoder 2224, an input/output circuit 2226, a column decoder 2228, a page buffer group 2232, and a current sensing circuit 2234.

The control logic 2210 may control the peripheral circuit 2220 under the control of the memory controller 2100 shown in FIG. 2. The control logic 2210 may control the peripheral circuit 2220 in response to a command CMD and an address ADD, which are received from the memory controller 2100 through the input/output circuit 2226. For example, the control logic 2210 may output an operation signal OP_CMD, a row address RADD, page buffer control signals PBSIGNALS, and an allowed bit VRY_BIT<#>, and a column address CADD in response to the command CMD and the address ADD. The control logic 2210 may determine whether a verify operation has passed or failed in response to a pass or fail signal PASS/FAIL received from the current sensing circuit 2234.

The peripheral circuit 2220 may perform a program operation for storing data in the memory cell array 2240, a read operation for outputting data stored in the memory cell array 2240, and an erase operation for erasing data stored in the memory cell array 2240.

The voltage generation circuit 2222 may generate various operating voltages Vop used in program, read, and erase operations in response to the operation signal OP_CMD received from the control logic 2210. For example, the voltage generation circuit 2222 may transfer a program voltage, a verify voltage, a pass voltage, a compensation program voltage, a read voltage, an erase voltage, a turn-on voltage, and the like to the row decoder 2224 through global lines.

The row decoder 2224 may transfer the operating voltages Vop to local lines LL coupled to a selected memory block among memory blocks of the memory cell array 2240 in response to the row address RADD received from the control logic 2210. The local lines LL may include local word lines, local drain select lines, and local source select lines. In addition, the local lines LL may include various lines such as a source line, which are coupled to the memory block.

The input/output circuit 2226 may transfer the command CMD and the address ADD, which are received from the memory controller 2100, to the control logic 2210 through input/output lines JO, or exchange data DATA with the column decoder 2228.

The column decoder 2228 may transfer data between the input/output circuit 2226 and the page buffer group 2232 in response to a column address CADD received from the control logic 2210. For example, the column decoder 2228 may exchange data with page buffers PB1 to PBm through data lines DL, or exchange data with the input/output circuit 2226 through column lines CL.

The page buffer group 2232 may be coupled to bit lines BL1 to BLm commonly coupled to memory blocks BLK1 to BLKi. The page buffer group 2232 may include a plurality of page buffers PB1 to PBm coupled to the bit lines BL1 to BLm. For example, one-page buffer may be coupled to each of the bit lines. The page buffers PB1 to PBm may operate in response to the page buffer control signals PBSIGNALS received from the control logic 2210. For example, in a program operation, the page buffers PB1 to PBm may temporarily store program data received from the memory controller 2100, and adjust a voltage applied to the bit lines BL1 to BLm according to the program data. Also, in a read operation, the page buffers PB1 to PBm may temporarily store data received through the bit lines BL1 to BLm, or sense a voltage or current of the bit lines BL1 to BLm. The page buffer group 2232 may be disposed corresponding to each of planes 2240a and 2240b.

In a read or verify operation, the current sensing circuit 2234 may generate a reference current in response to the allowed bit VRY_BIT<#> received from the control logic 2210, and output a pass or fail signal PASS/FAIL by comparing a sensing voltage VPB received from the page buffer group 2232 with a reference voltage corresponding to the reference current.

The memory cell array 2240 may include a plurality of planes 2240a and 2240b. Although two planes 2240a and 2240b are illustrated in FIG. 4, the number of planes included in the die D1 is not limited thereto. Each of the plurality of planes 2240a and 2240b may include a plurality of memory blocks BLK1 to BLKi in which data is stored. User data and various information required to perform an operation of the memory device 2200 may be stored in the memory blocks BLK1 to BLKi. The memory blocks BLK1 to BLKi may be implemented in a two-dimensional structure or a three-dimensional structure, and be configured identical to one another.

Figure 5:
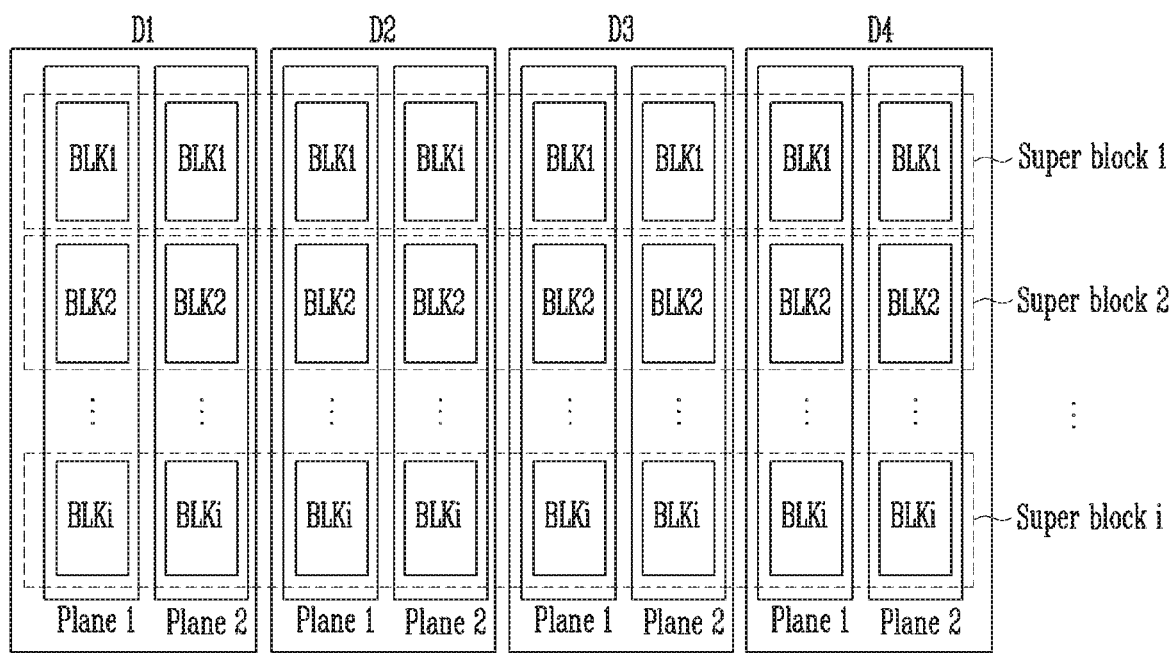
FIG. 5 is a diagram illustrating an exemplary super block.

FIG. 5 is a diagram illustrating an arrangement of a super block.

In an example, a case where the memory device includes four dies D1, D2, D3, and D4, each of which includes two planes Plane 1 and Plane 2, each of which includes i memory blocks BLK1 to BLKi is illustrated in FIG. 5. The number of dies included in the memory device 2200 and the number of planes included in each die are not limited to the illustrated arrangement.

The memory controller 2100 may group memory blocks belonging to dies D1, D2, D3, and D4 to manage the grouped memory blocks as one super block. For example, a memory block BLK1 belonging to Plane 1 of die 1 D1, a memory block BLK1 belonging to Plane 2 of the die 1 D1, a memory block BLK1 belonging to Plane 1 of die 2 D2, a memory block BLK1 belonging to Plane 2 of the die 2 D2, a memory block BLK1 belonging to Plane 1 of die 3 D3, a memory block BLK1 belonging to Plane 2 of the die 3 D3, a memory block BLK1 belonging to Plane 1 of die 4 D4, and a memory block BLK1 belonging to Plane 2 of the die 4 D4 may be grouped and managed as one super block.

Figure 6:
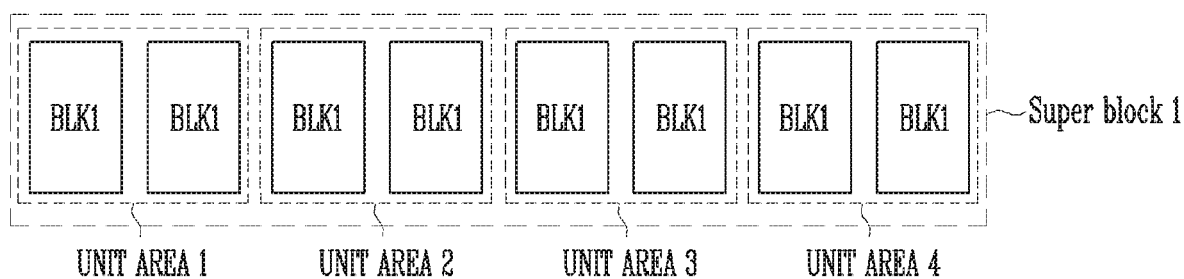
FIG. 6 is a diagram illustrating unit areas constituting the super block in accordance with an embodiment of the present disclosure.

FIG. 6 is a diagram illustrating unit areas constituting a single super block in accordance with an embodiment of the present disclosure.

For clarity, in FIG. 6, only one super block (e.g., Super block 1) among the super blocks shown in FIG. 5 is illustrated.

The super block may be divided into a plurality of unit areas. In FIG. 6, a case where one super block (Super Block 1) is divided into four-unit areas (UNIT AREAS 1-4) is illustrated as an example. The memory controller 2100 may determine the number of unit areas constituting one super block according to a set reference, or receive such information from an external source.

An example in which each of the unit areas includes two memory blocks is illustrated in FIG. 6. However, in some embodiments of the present disclosure, the number of memory blocks included in each of the unit areas may be changed. For example, one-unit area may include one memory block, and one super block may be configured with eight-unit areas. In another example, one-unit area may include four memory blocks, and one super block may be configured with two-unit areas.

Figure 7:
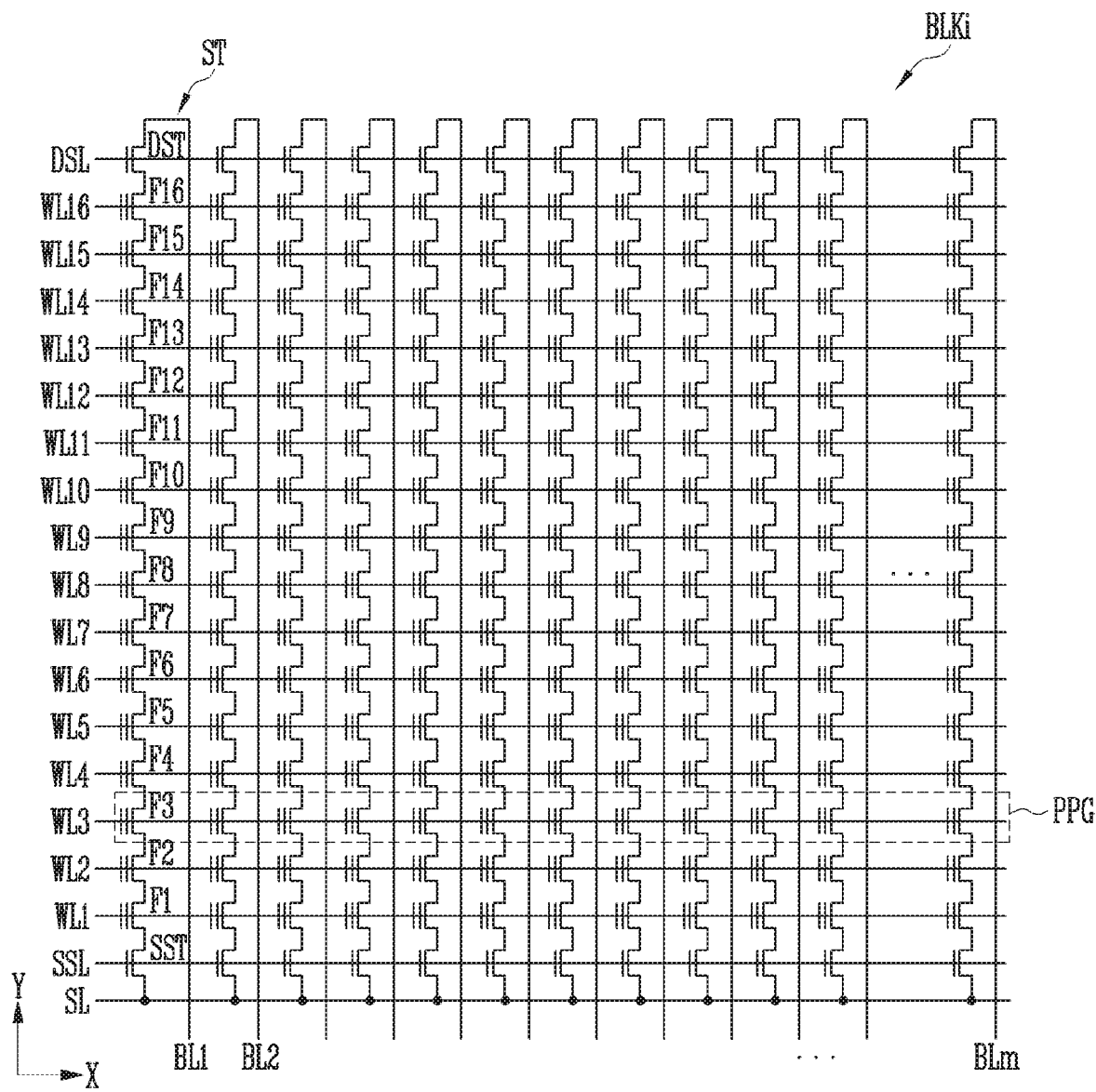
FIG. 7 is a diagram illustrating an exemplary memory block.

FIG. 7 is a diagram illustrating an exemplary memory block.

Referring to FIG. 7, in the memory block BLKi, a plurality of word lines WL1 to WL16 arranged in parallel may be coupled between a first select line and a second select line. The first select line may be a source select line SSL, and the second select line may be a drain select line DSL. Specifically, the memory block BLKi may include a plurality of strings ST coupled between bit lines BL1 to BLm and a source line SL. The bit lines BL1 to BLm may be coupled to the strings ST, respectively, and the source line SL may be commonly coupled to the strings ST. The strings ST may be configured identically to one another, and therefore, a string ST coupled to a first bit line BL1 will be described in detail as an example.

The string ST may include a source select transistor SST, a plurality of memory cells F1 to F16, and a drain select transistor DST, which are coupled in series to each other between the source line SL and the first bit line BL1. At least one source select transistor SST and at least one drain select transistor DST may be included in one string ST, and more than the 16 memory cells F1 to F16 shown in the drawing may be included in one string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of source select transistors SST included in different strings ST may be coupled to the source select line SSL, gates of drain select transistors DST included in different strings ST may be coupled to the drain select line DSL, gates of the memory cells F1 to F16 included in different strings ST may be coupled to the plurality of word lines WL1 to WL16. A group of memory cells coupled to the same word line among the memory cells included in different strings ST may be a physical page PPG. Therefore, physical pages PPG, of which number corresponds to that of the word lines WL1 to WL16, may be included in the memory block BLKi.

One memory cell may store data of one bit. This is called as a single level cell (SLC). One physical page PPG may store one logical page (LPG) data. The one LPG data may include data bits of which number corresponds to that of cells included in one physical page PPG. Alternatively, one memory cell may store data of two or more bits. This is called as a multi-level cell (MLC). One physical page PPG may store two or more LPG data.

A plurality of memory cells included in one physical page PPG may be programmed at the same time. In other words, the memory device 2200 may perform a program operation in units of physical pages PPG. A plurality of memory cells included in one memory block may be erased at the same time. In other words, the memory device 2200 may perform an erase operation in units of memory blocks BLKi. Therefore, the memory block BLKi may be called as an erase unit block. For example, in order to update a portion of data stored in one memory block BKLi, all data stored in the corresponding memory block BLKi are read, and data to be updated among the read data is modified. Then, all the data are programmed in another memory block BLKi.

Figure 8:
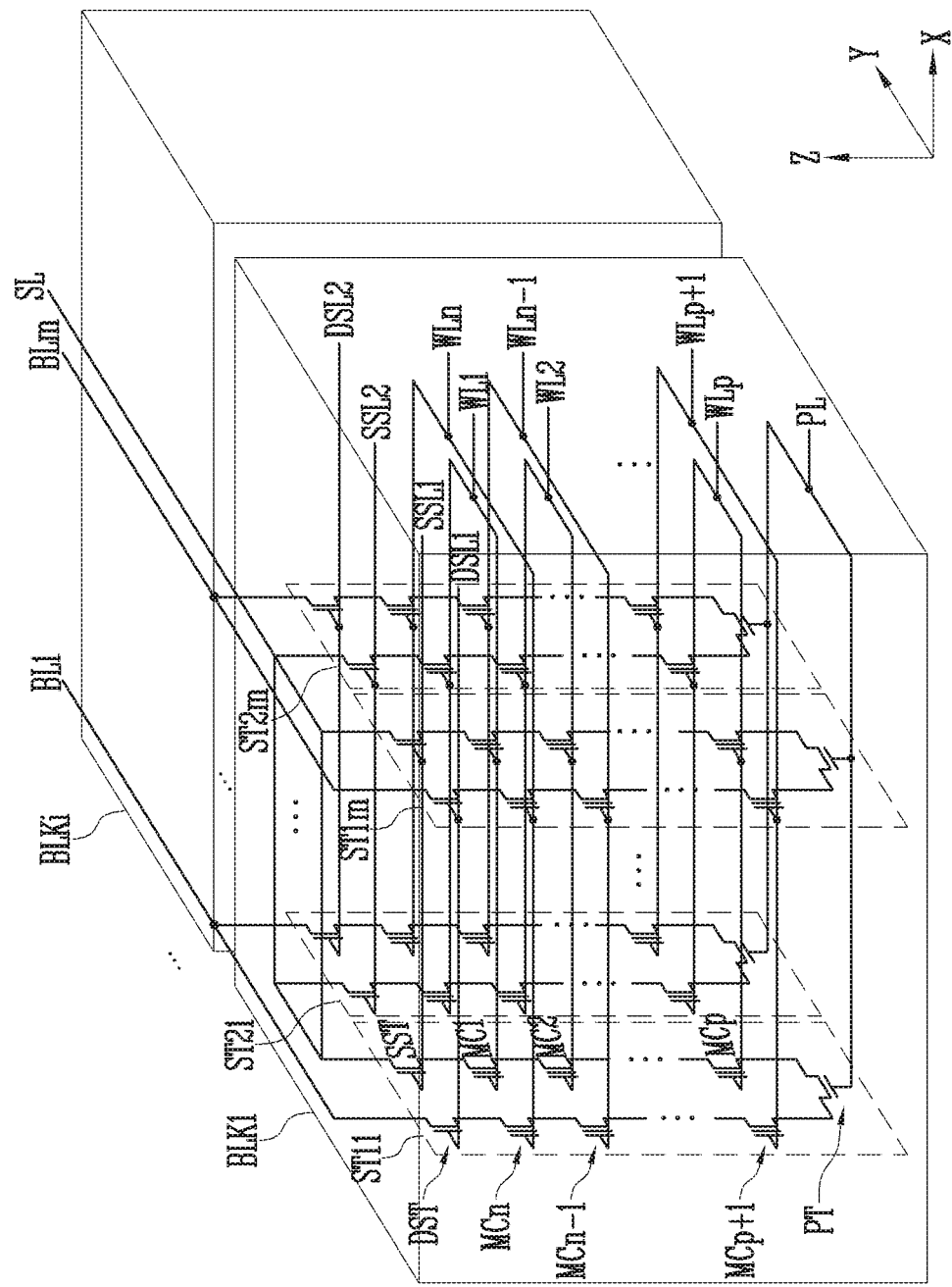
FIG. 8 is a diagram illustrating an embodiment of a three-dimensionally configured memory block.

FIG. 8 is a diagram illustrating an embodiment of a three-dimensionally configured memory block.

Referring to FIG. 8, the memory cell array 2240 may include a plurality of memory blocks BLK1 to BLKi. A first memory block BLK1 will be described as an example. The first memory block BLK1 may include a plurality of strings ST11 to ST1m and ST21 to ST2m. In an embodiment, each of the plurality of strings ST11 to ST1m and ST21 to ST2m may be formed in a 'U' shape. In the first memory block BLK1, m strings may be arranged in a row direction (X direction). Although FIG. 8 illustrates that two strings are arranged in a column direction (Y direction), this is for clarity; three or more strings may be arranged in the column direction (Y direction).

Each of the plurality of strings ST11 to ST1m and ST21 to ST2m may include at least one source select transistor SST, first to nth memory cells MC1 to MCn, a pipe transistor PT, and at least one drain select transistor DST.

The source and drain select transistors SST and DST and the memory cells MC1 to MCn may have structures similar to one another. For example, each of the source and drain select transistors SST and DST and the memory cells MC1 to MCn may include a channel layer, a tunnel insulating layer, a charge trapping layer, and a blocking insulating layer.

For example, a pillar for providing the channel layer may be provided in each string. For example, a pillar for providing at least one of the channel layer, the tunnel insulating layer, the charge trapping layer, and the blocking insulating layer may be provided in each string.

The source select transistor SST of each string may be coupled between a source line SL and memory cells MC1 to MCp.

In an embodiment, source select transistors of strings arranged in the same row may be coupled to a source select line extending in the row direction, and source select transistors of strings arranged in different rows may be coupled to different source select lines. In FIG. 8, source select transistors of strings ST11 to ST1m of a first row may be coupled to a first source select line SSL1. Source select transistors of strings ST21 to ST2m of a second row may be coupled to a second source select line 55L2.

In another embodiment, the source select transistors of the strings ST11 to ST1m and ST21 to ST2m may be commonly coupled to one source select line.

First to nth memory cells MC1 to MCn of each string may be coupled between the source select transistor SST and the drain select transistor DST.

The first to nth memory cells MC1 to MCn may be divided into first to p-th memory cells MC1 to MCp and (p+1)th to nth memory cells MCp+1 to MCn. The first to pth memory cells MC1 to MCp may be sequentially arranged in a vertical direction (Z direction), and be coupled in series to each other between the source select transistor SST and the pipe transistor PT. The (p+1)th to nth memory cells MCp+1 to MCn may be sequentially arranged in the vertical direction (Z direction), and be coupled in series to each other between the pipe transistor PT and the drain select transistor DST. The first to pth memory cells MC1 to MCp and the (p+1)th to nth memory cells MCp+1 to MCn may be coupled to each other through the pipe transistor PT. Gates of the first to nth memory cells MC1 to MCn of each string may be coupled to first to nth word lines WL1 to WLn, respectively.

In an embodiment, at least one of the first to nth memory cells MC1 to MCn may be used as a dummy memory cell. When a dummy memory cell is provided, the voltage or current of a corresponding string may be stably controlled. A gate of the pipe transistor PT of each string may be coupled to a pipe line PL.

The drain select transistor DST of each string may be coupled to a bit line and the memory cells MCp+1 to MCn. Strings arranged in the row direction may be coupled to a drain select line extending in the row direction. Drain select transistors of the strings ST11 to ST1m, of the first row may be coupled to a first drain select line DSL1. Drain select transistors of the strings ST21 to ST2m of the second row may be coupled to a second drain select line DSL2.

Strings arranged in the column direction may be coupled to bit lines extending in the column direction. In FIG. 8, strings ST11 and ST21 of a first column may be coupled to a first bit line BL1. Strings ST1m and ST2m of an mth column may be coupled to an mth bit line BLm.

Memory cells coupled to the same word line among the strings arranged in the row direction may constitute one page. For example, memory cells coupled to the first word line WL1 among the strings ST11 to ST1m of the first row may constitute one page. Memory cells coupled to the first word line WL1 among the strings ST21 to ST2m of the second row may constitute another page. When any one of the drain select lines DSL1 and DSL2 is selected, strings arranged in one row direction may be selected. When any one of the word lines WL1 to WLn is selected, one page among the selected strings may be selected.

Figure 9:
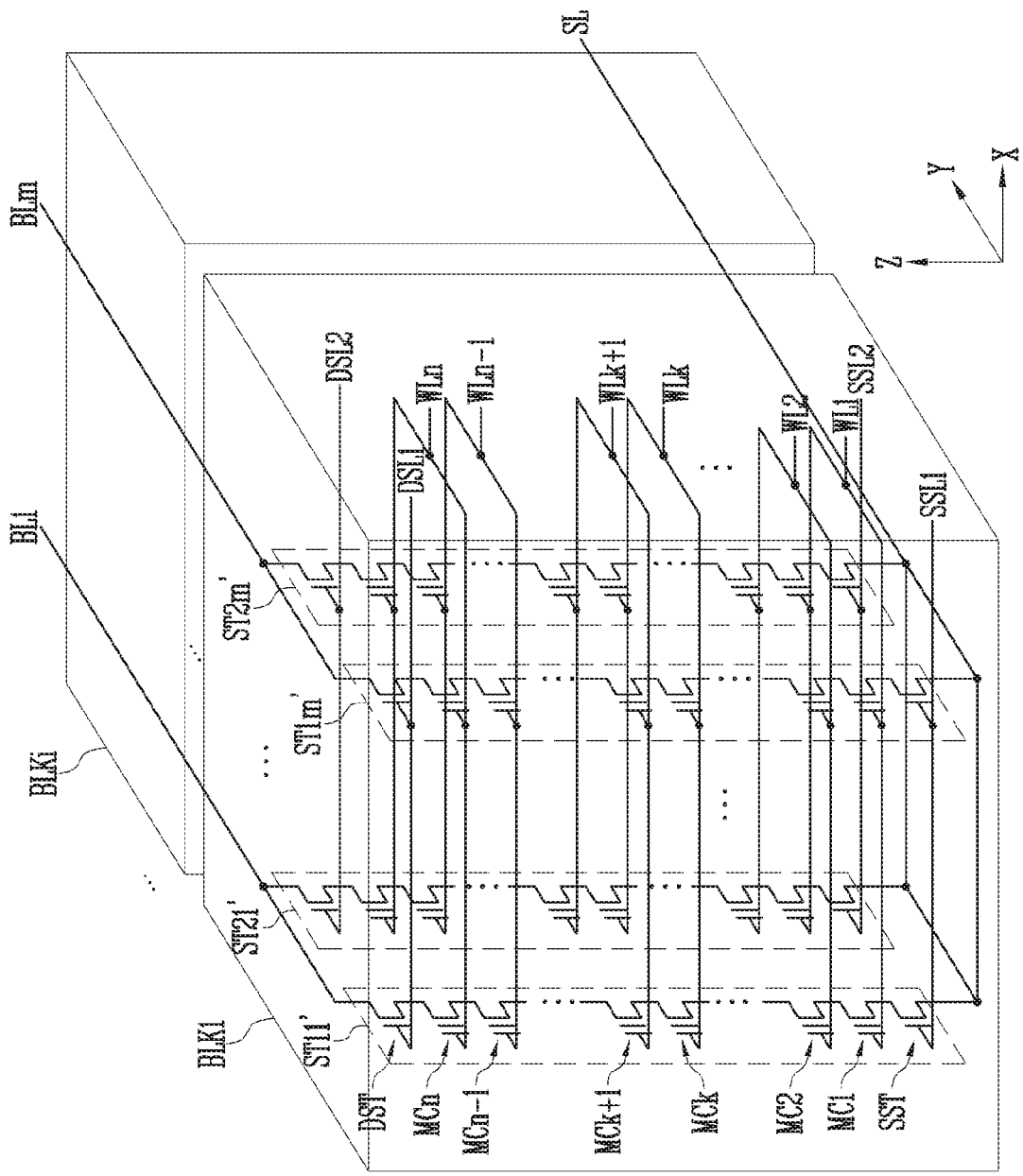
FIG. 9 is a diagram illustrating another embodiment of a three-dimensionally configured memory block.

FIG. 9 is a diagram illustrating another embodiment of a three-dimensionally configured memory block.

Referring to FIG. 9, the memory cell array 2240 may include a plurality of memory blocks BLK1 to BLKi. A first memory block BLK1 will be described as an example. The first memory block BLK1 may include a plurality of strings ST11' to ST1m' and ST21' to ST2m'. Each of the plurality of strings ST11' to ST1m' and ST21' to ST2m' may extend along a vertical direction (Z direction). In the first memory block BLK1, m strings may be arranged in a row direction (X direction). Although FIG. 9 illustrates that two strings are arranged in a column direction (Y direction), this is for clarity; three or more strings may be arranged in the column direction (Y direction).

Each of the plurality of strings ST11' to ST1m' and ST21' to ST2m' may include at least one source select transistor SST, first to n-th memory cells MC1 to MCn, and at least one drain select transistor DST.

The source select transistor SST of each string may be coupled between a source line SL and the memory cells MC1 to MCn. Source select transistors of strings arranged in the same row may be coupled to the same source select line. Source select transistors of strings ST11' to ST1m' arranged on a first row may be coupled to a first source select line SSL1. Source select transistors of strings ST21' to ST2m' arranged on a second row may be coupled to a second source select line 55L2. In another embodiment, the source select transistors of the strings ST11' to ST1m' and ST21' to ST2m' may be commonly coupled to one source select line.

The first to nth memory cells MC1 to MCn of each string may be coupled in series to each other between the source select transistor SST and the drain select transistor DST. Gates of the first to nth memory cells MC1 to MCn may be coupled to first to nth word lines WL1 to WLn, respectively.

In an embodiment, at least one of the first to n-th memory cells MC1 to MCn may be used as a dummy memory cell. When a dummy memory cell is provided, the voltage or current of a corresponding string may be stably controlled. Accordingly, the reliability of data stored in the first memory block BLK1 may be improved.

The drain select transistor DST of each string may be coupled between a bit line and the memory cells MC1 to MCn. Drain select transistors DST of strings arranged in the row direction may be coupled to a drain select line extending in the row direction. The drain select transistors DST of the strings ST11' to ST1m' of the first row may be coupled to a first drain select line DSL1. The drain select transistors DST of the strings ST21' to ST2m' of the second row may be coupled to a second drain select line DSL2.

That is, the first memory block BLK1 of FIG. 9 may have a circuit identical to that of the first memory block BLK1 of FIG. 8, except that the pipe transistor PT is excluded from each string.

Figure 10:
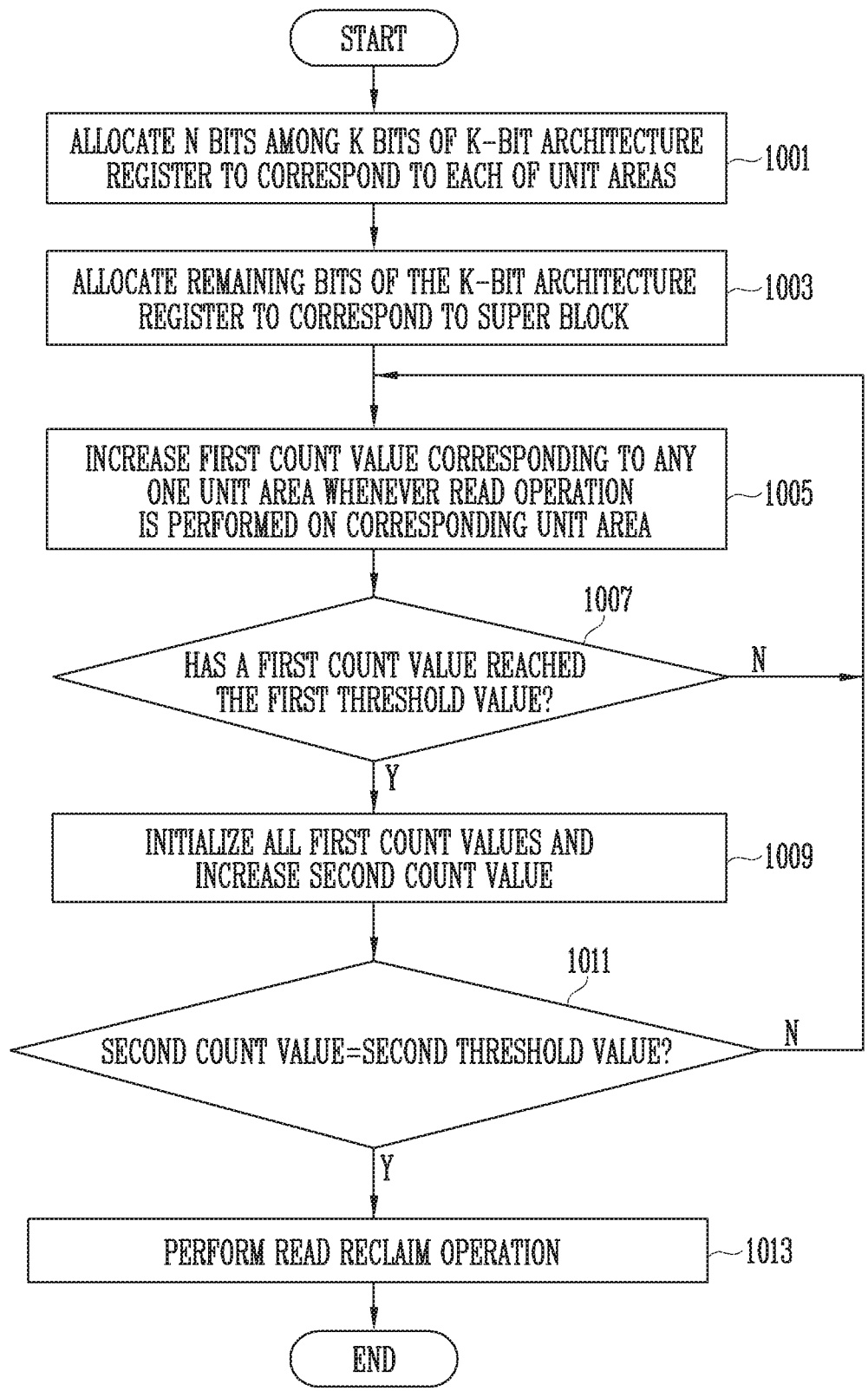
FIG. 10 is a flowchart illustrating an operating method of the memory controller in accordance with an embodiment of the present disclosure.

FIG. 10 is a flowchart illustrating an operating method of the memory controller in accordance with an embodiment of the present disclosure.

The embodiment described with reference to FIG. 10 may be applied to the memory controller 2100 described with reference to FIGS. 1 to 3.

In step 1001, the memory controller may allocate N bits, among the K bits of the K-bit architecture register, to correspond to each of a plurality of unit areas constituting one super block. This may mean that N bits are allocated to a first counter corresponding to each unit area. When N bits are allocated to the first counter, the first counter may count up to the first threshold value as a maximum value that can be counted using N bits. For example, when the K-bit architecture register is a 32-bit architecture register, and the number of unit areas constituting one super block is 4, the memory controller may allocate 4 bits to each unit area. Therefore, the first counter may count up to 16, which is the first threshold value. When the first counter is implemented in software, the memory controller may generate a first counter corresponding to each unit area. For example, when the number of unit areas is 4, four first counters may be generated.

In step 1003, the memory controller may allocate remaining bits, among the K bits of the K-bit architecture register, to correspond to one super block. For example, when the K-bit architecture register is a 32-bit architecture register, the number of unit areas constituting one super block is 4, and 4 bits are allocated to each unit area, the remaining bits may be 16 bits. The memory controller may allocate all or a portion of the remaining bits to one super block. This may mean that remaining bits are allocated to a second counter corresponding to the super block. For example, 16 bits are allocated to the second counter, which may count a second threshold value within a maximum value that can be counted using 16 bits. When the second counter is implemented in software, the memory controller may generate a second counter corresponding to the super block.

Steps 1001 and 1003 may be performed at the same time, and the memory controller may determine a number N of bits allocated to correspond to each of the unit areas and the second threshold value such that the value obtained by multiplying the first threshold value and the second threshold value represents a target count value. This will be described later with reference to FIG. 11.

In steps 1005 to 1013, it is assumed that an access number is a number of read accesses, e.g., a read number, and the target count value is a reference value for a read reclaim operation to be performed.

In the step 1005, the memory controller may increase, by '1', a first count value of a first counter corresponding to a unit area, among the plurality of unit areas constituting the super block, whenever a read operation is performed on the corresponding unit area.

In the step 1007, the memory controller may check whether a first count value has reached the first threshold value. This may mean a case where the first count value is changed from a decimal numeral '0' to a decimal numeral '$2^N-1$.' For example, this may mean that, when the number N of bits allocated to the first counter is 4, the count value of the first counter has reached the first threshold value when the first count value is changed from a binary numeral '0000' to a binary numeral '1111.' When a first count value has reached the first threshold value (Y at step 1007), the step 1009 may be performed, and otherwise, the method returns to step 1005.

In the step 1009, the memory controller may initialize all first count values and increase a second count value by '1'. That is, the memory controller may initialize all the first count values to the decimal numeral '0' whenever any of the first count values reaches the first threshold value.

In the step 1011, the memory controller may check whether the second count value has reached the second threshold value. When the second count value reaches the second threshold value, the step 1013 may be performed, and otherwise, the method returns to step 1005.

In the step 1013, the memory controller may perform a read reclaim operation on the super block. The memory controller may initialize all of the first and second count values in the read reclaim operation.

Figure 11:
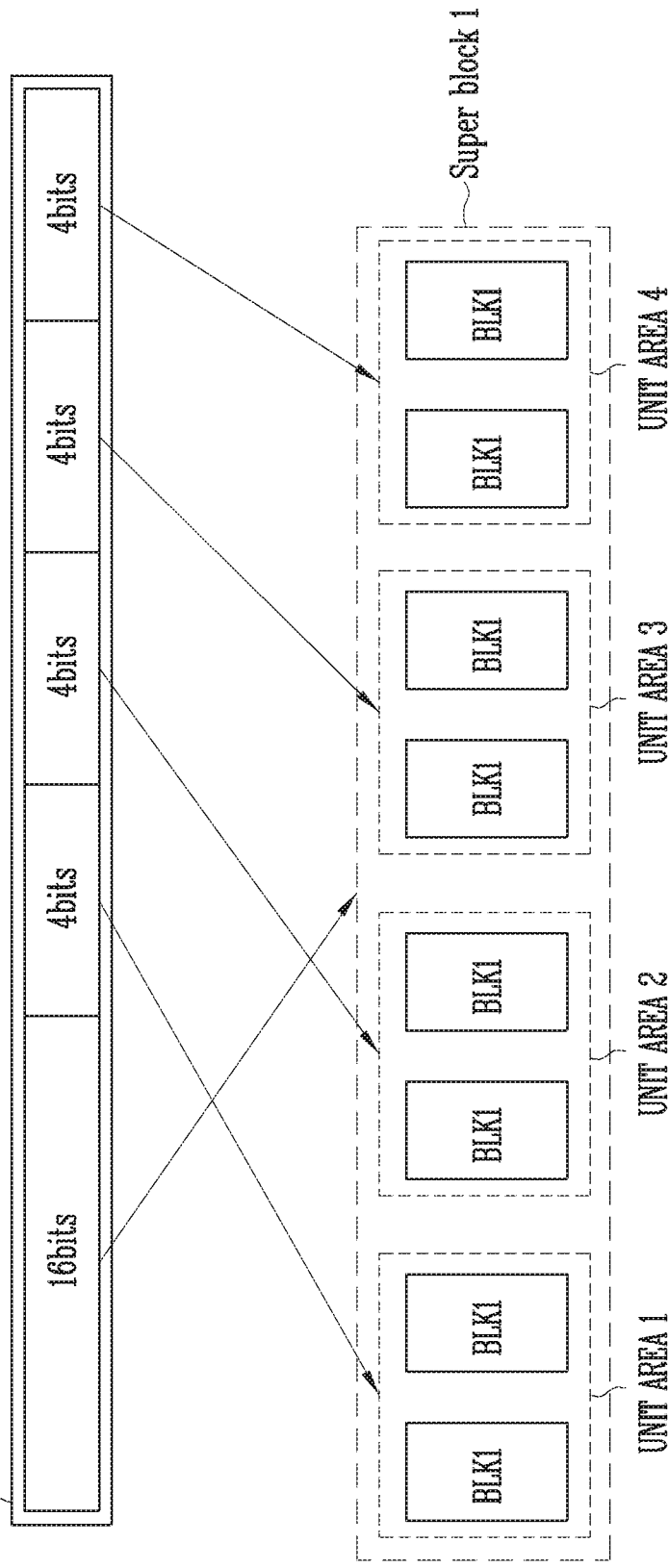
FIG. 11 is a flowchart illustrating an operating method of the memory controller in accordance with an embodiment of the present disclosure.

FIG. 11 is a flowchart illustrating an operating method of the memory controller in accordance with an embodiment of the present disclosure.

In FIG. 11, a case where a 32-bit architecture register is used, and one super block is configured with four-unit areas is illustrated as an example.

As described above, the memory controller may allocate N bits, among the K bits of the K-bit architecture register, to correspond to each unit area, and allocate remaining bits to correspond to a super block.

In addition, as described above, N may be determined such that the value obtained by multiplying the first threshold value as a maximum value that can be counted using N bits and the second threshold value that can be counted using remaining bits represents a target count value. Also, the memory controller may determine the second threshold value such that the value obtained by the first threshold value and the second threshold value represents the target count value.

For example, the memory controller may select N satisfying Equation 1.

$$2^N \times 2^{K-MN} \geq \text{Target Value} \quad \text{<Equation 1>}$$

In Equation 1, N is a number of bits allocated per unit area, K is a number of bits of the K-bit architecture register, and M is a number of unit areas.

For example, when a 32-bit architecture register is used, the number of unit areas is 4, and the target count value is 200000, Equation 1 may be calculated as shown in Equations 2 and 3.

$$2^N \times 2^{32-4N} \geq 200000, \text{ which may be reduced to} \quad \text{<Equation 2>}$$

$$2^{32-3N} \geq 200000 \quad \text{<Equation 3>}$$

Values of N satisfying Equation 3 are 1, 2, 3, and 4. Therefore, the memory controller may allocate 1 bit, 2 bits, 3 bits or 4 bits per unit area.

The memory controller may allocate the largest value among the values of N satisfying Equation 3 to each unit area. That is, in the above example, the memory controller may allocate 4 bits per unit area. Also, the memory controller may allocate 16 bits, as remaining bits, to correspond to the super block. When a number N of bits to be allocated to each of the unit area is determined, the memory controller may determine the second threshold value such that the value obtained by the first threshold value and the second threshold value represents the target count value. When 4 bits are allocated per unit area, the first threshold value 16, and therefore, 12500, which is the value obtained by dividing 16 into 200000 as the target count value, may be determined as the second threshold value.

When a large value of the N is selected, the performance of the memory system may be improved. This will be described with reference to FIG. 12.

Figure 12:
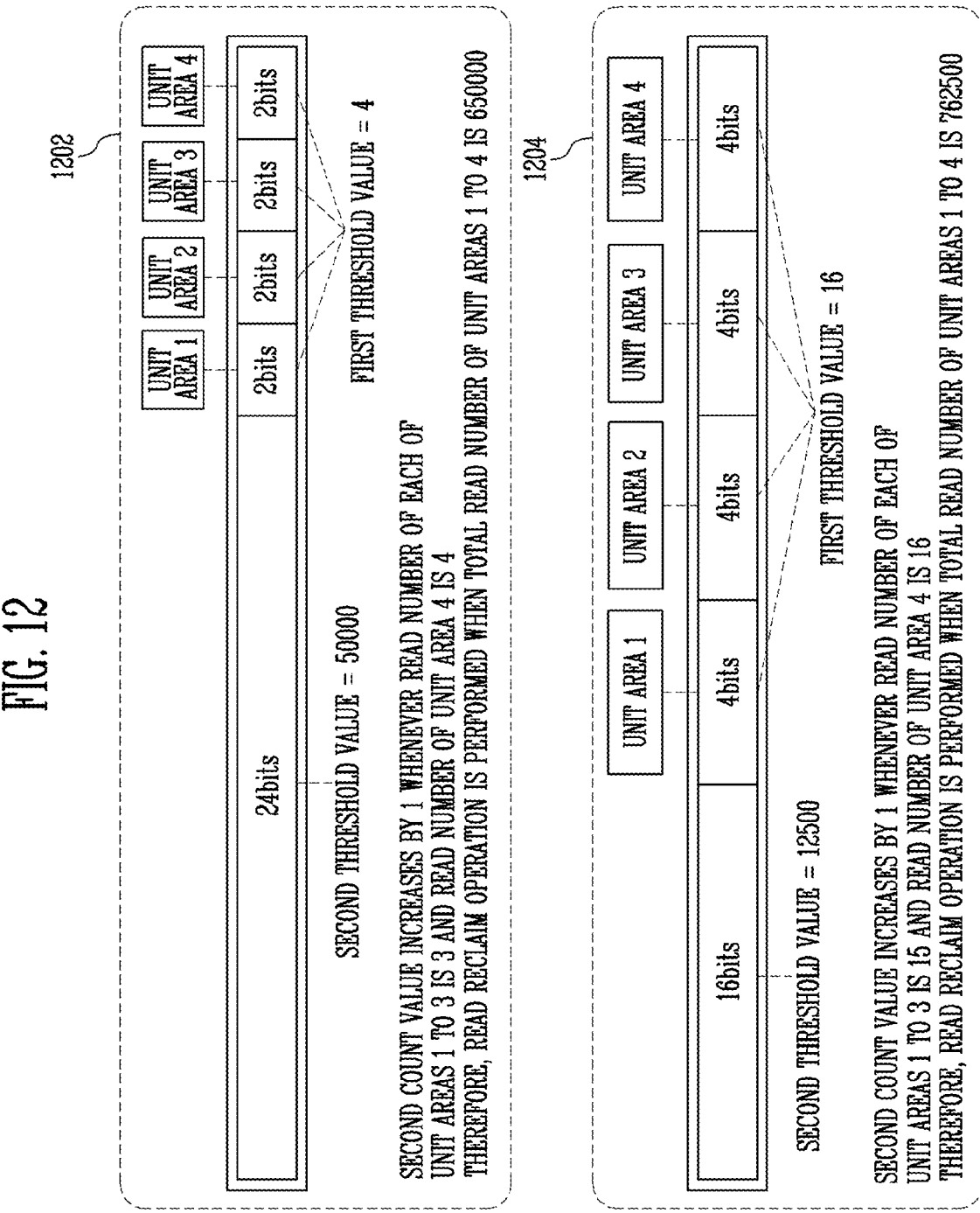
FIG. 12 is a diagram illustrating a difference according to numbers of bits allocated per unit area in accordance with an embodiment of the present disclosure.

FIG. 12 is a diagram illustrating a difference according to numbers of bits allocated per unit area.

Reference numeral 1202 of FIG. 12 represents a case where 2 bits are allocated to each of four-unit areas. When the target count value for the read reclaim operation is 200000, the first threshold value per unit area is 4, and therefore, the second threshold value is 50000.

When the read number of unit area 4 is 4 and the read number of each of unit areas 1 to 3 is 3, the second count value may increase by '1'. That is, when the total read number of the unit areas (i.e., the unit areas 1 to 4) is 13, the second count value may increase by '1'. When this situation repeatedly occurs, the read reclaim operation may be performed when the total read number of all of the unit areas (i.e., the unit areas 1 to 4) is 650000 (13×50000).

Reference numeral 1204 of FIG. 12 represents a case where 4 bits are allocated to each of four-unit areas. When the target count value for the read reclaim operation is 200000 like the case of the reference numeral 1202, the first threshold value per unit area is 16, and therefore, the second threshold value is 12500.

When the read number of unit area 4 is 16 and the read number of each of unit areas 1 to 3 is 15, the second count value may increase by '1'. That is, when the total read number of the unit areas (i.e., the unit areas 1 to 4) is 61, the second count value may increase by '1'. When this situation repeatedly occurs, the read reclaim operation may be performed when the total read number of all of the unit areas (i.e., the unit areas 1 to 4) is 762500 (61×12500).

That is, the case indicated by reference numeral 1202 is identical to that indicated by reference numeral 1204 in that the read reclaim operation is performed when the read number of the unit area 4 is 200000. However, in the case indicated by reference numeral 1204, in which a larger number of bits are allocated per unit area than that in the case indicated by reference numeral 1202, the read reclaim operation may be less frequently performed than the case of the reference numeral 1202.

The first count value and the second count value may be initialized whenever a super block is erased, and the first threshold value and the second threshold value may be changed depending on an erase number of the super block. This will be described with reference to FIG. 13.

Figure 13:
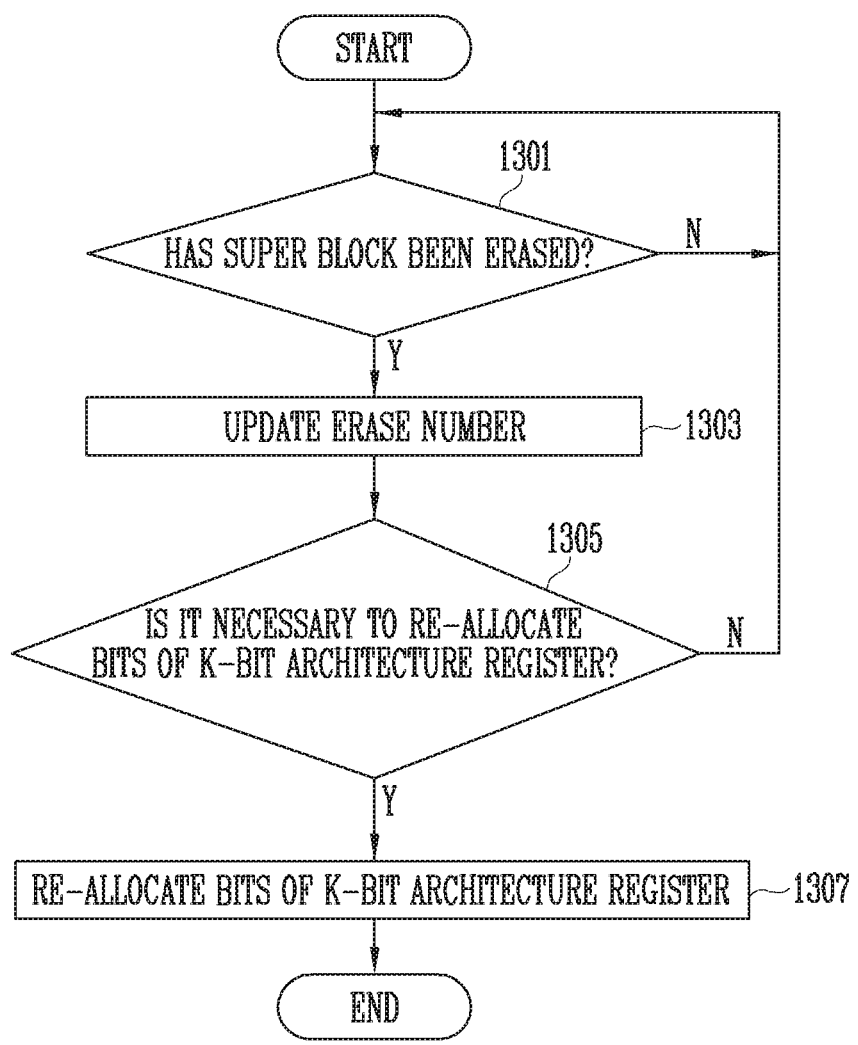
FIG. 13 is a flowchart illustrating an operating method of the memory controller in accordance with an embodiment of the present disclosure.

FIG. 13 is a flowchart illustrating an operating method of the memory controller in accordance with an embodiment of the present disclosure.

At least some of steps shown in FIG. 13 may be simultaneously performed while at least some of the steps shown in FIG. 10 are being performed.

In step 1301, the memory controller may check whether an erase command for a super block has been generated. When the erase command for the super block is generated, the memory controller may initialize the first count value and the second count value. Subsequently, step 1303 may be performed. When the erase command for the super block is not generated, the step 1301 may be performed.

In the step 1303, the memory controller may update an erase number of the super block.

In step 1305, the memory controller may determine whether it is necessary to re-allocate the bits of the K-bit architecture register. This determination may be made based on a set policy. For example, it may be defined in the policy to apply different target count values according to the erase number of the super block. For example, it may be defined in the policy to perform the read reclaim operation when the erase number of the super block is less than 100 and the read number of the super block is 200000, and perform the read reclaim operation when the erase number of the super block is 100 or more and the read number of the super block is 40000. That is, the policy may define setting the target count value lower as the erase number of the super block increases. The memory controller may determine whether it is necessary to re-allocate the bits of the K-bit architecture register with reference to the policy. When it is determined that it is necessary to re-allocate the bits of the K-bit architecture register, step 1307 may be performed, and otherwise, the step 1301 may be performed.

In the step 1307, the memory controller may allocate bits of the K-bit architecture register to correspond to a plurality of unit areas constituting the super block and the super block. The allocation may be made using the same principle as described with reference to the steps 1001 and 1003 of FIG. 10. However, since the target count value is changed, numbers of bits allocated to the unit areas and the super block may be changed. For example, when the target count value decreases, numbers of bits used to count the first and second threshold values are changed. As described above, when the number of bits used to count the first threshold value decreases, the reliability of the memory system may be improved. Hence, numbers of bits corresponding to each of the unit areas and the super block may be re-allocated. This will be described with reference to FIG. 14.

Figure 14:
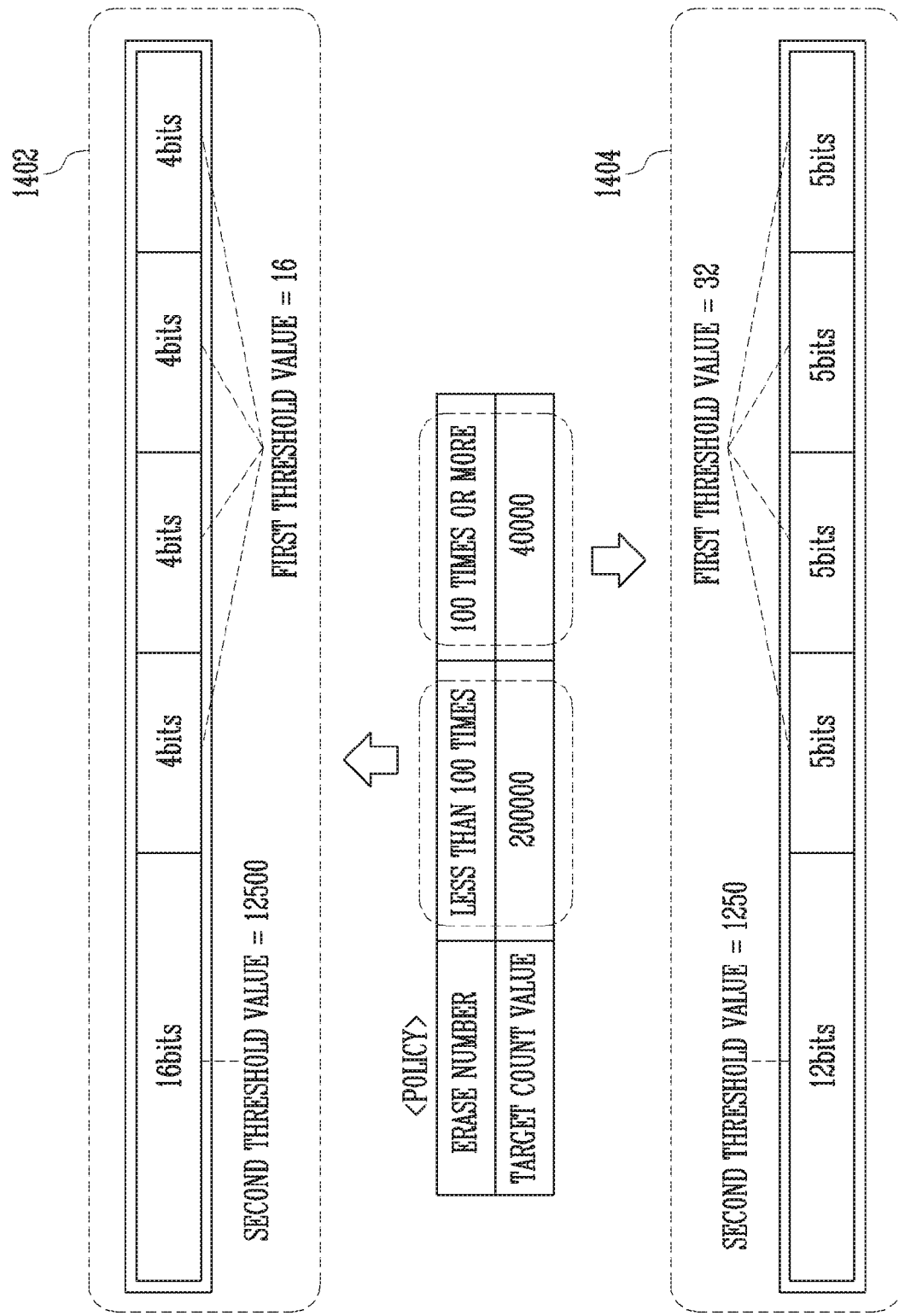
FIG. 14 is a diagram illustrating numbers of bits differently allocated according to erase numbers in accordance with an embodiment of the present disclosure.

FIG. 14 is a diagram illustrating numbers of bits differently allocated according to erase numbers.

As shown in FIG. 14, it is defined in the policy to perform the read reclaim operation when the erase number is less than 100 and the target count value reaches 200000, and to perform the read reclaim operation when the erase number is 100 or more and the target count value is 40000. In addition, in this example, the number of unit areas constituting a super block is 4, and a 32-bit architecture register is used.

Reference numeral 1402 of FIG. 14 represents numbers of bits allocated to each unit area and the super block when the erase number is less than 100. When the erase number is less than 100, the target count value is 200000. Hence, 4 bits may be allocated to each unit area, and 16 bits may be allocated to the super block. This is the same as described with reference to FIG. 11.

Reference numeral 1404 of FIG. 14 represents numbers of bits allocated to each unit area and the super block when the erase number is 100 or more. When the erase number is 100 or more, the target count value is 40000. Hence, it is necessary to adjust the numbers of bits allocated to each unit area and the super block.

Therefore, Equation 3 may be as shown in Equation 4.

$$2^{32-3N} \geq 40000 \qquad \text{<Equation 4>}$$

Values of N satisfying Equation 4 are 1, 2, 3, 4, and 5. Therefore, the memory controller may allocate 1 bit, 2 bits, 3 bits, 4 bits or 5 bits per unit area. As described with reference to FIGS. 11 and 12, when the value of N increases, the performance of the memory system is improved. Therefore, the memory controller may select 5, which is the largest value among the values of N satisfying Equation 4. That is, the memory controller may allocate 5 bits to each of the unit areas, and allocate 12 bits to the super block. The memory controller may adjust the second threshold value to be suitable for the changed number of bits. In the above-described example, the second threshold value may be 1250. That is, the memory controller may perform the read reclaim operation when the second count value is 1250.

As described above, the number of unit areas may be differently determined according to whether the super block is a sequential block or a random block. This will be described with reference to FIG. 15.

Figure 15:
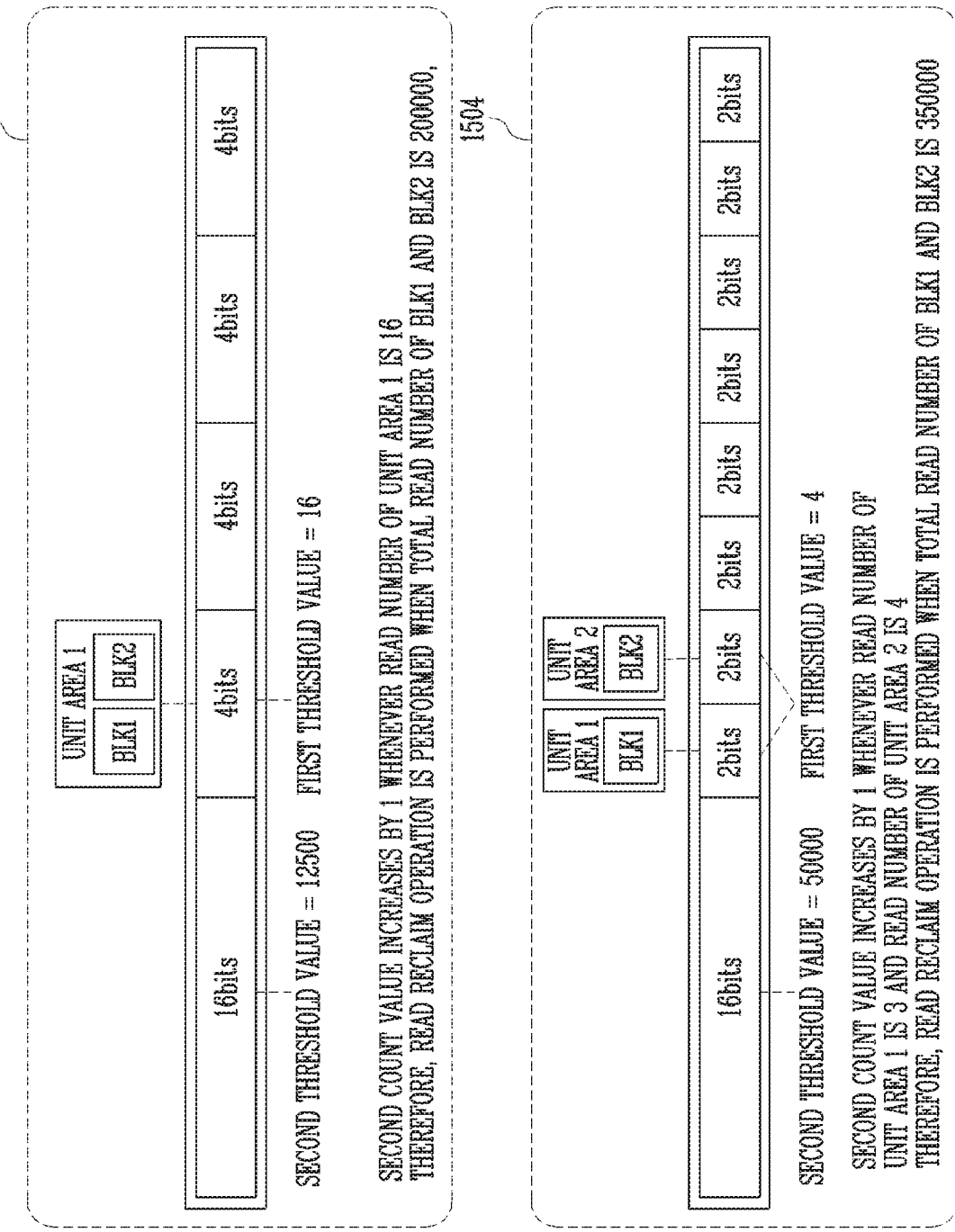
FIG. 15 is a diagram illustrating numbers of unit areas, which are differently determined according to whether the super block is a sequential block or a random block, in accordance with an embodiment of the present disclosure.

FIG. 15 is a diagram illustrating numbers of unit areas, which are differently determined according to whether the super block is a sequential block or a random block.

Reference numeral 1502 of FIG. 15 represents a case where a super block is configured with four-unit areas, and each of the unit areas includes two memory blocks. For clarity, only one-unit area (unit area 1) is illustrated with respect to reference numeral 1502 of FIG. 15.

When the super block is a random block, a count value corresponding to the entire unit area 1 increases when a read operation is performed on any one memory block among memory blocks BLK1 and BLK2 included in the unit area 1. That is, when the total read number of the memory blocks BLK1 and BLK2 is 16, the second count value may increase by '1'. When this situation repeatedly occurs, the read reclaim operation may be performed when the total read number of the memory blocks BLK1, BLK2 is 200000 (16×12500).

Reference numeral 1504 of FIG. 15 represents a case where a super block is configured with eight-unit areas, and each of the unit areas includes one memory block. For clarity, only two-unit areas (unit area 1 and unit area 2) are illustrated with respect to reference numeral 1504 of FIG. 15.

When the super block is a random block, a count value corresponding to the unit area 1 increases when a read operation is performed on the memory block BLK1, and a count value corresponding to the unit area 2 increases when a read operation on the memory block BLK2. When the read number of the unit area 2 is 4 and the read number of the unit area 1 is 3, the second count value may increase by '1'. That is, when the total read number of the memory blocks BLK1 and BLK2 is 7, the second count value may increase by '1'. When this situation repeatedly occurs, the read reclaim operation may be performed when the total read number of the memory blocks BLK1 and BLK2 is 350000 (7×50000).

That is, when comparing the case indicated by reference numeral 1502 and the case indicated by reference numeral 1504, the read reclaim operation may be less frequently performed when the number of unit areas increases in the random block.

Figure 16:
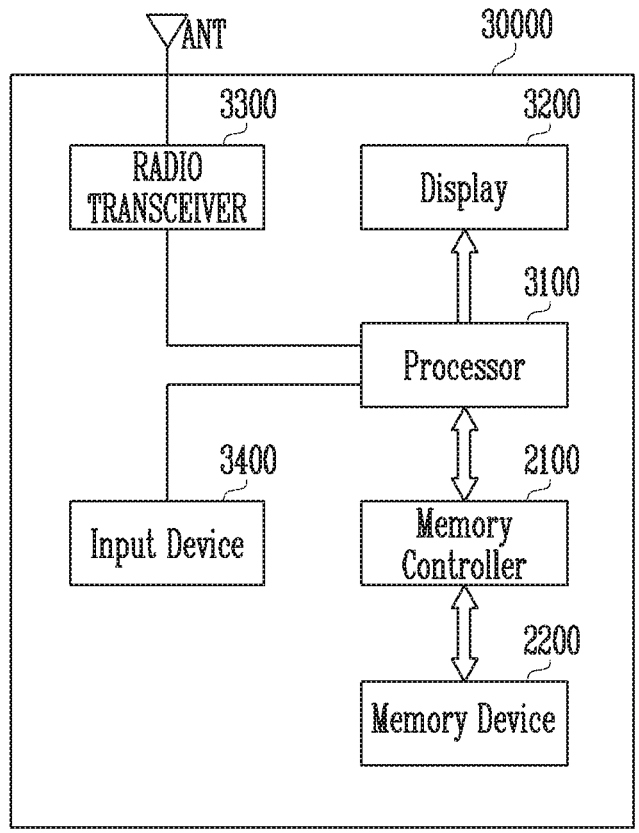
FIGS. 16 to 19 are diagrams illustrating other examples of the memory system including the memory controller shown in FIGS. 1 to 3.

FIG. 16 is a diagram illustrating another example of the memory system including the memory controller shown in FIGS. 1 to 3.

Referring to FIG. 16, the memory system 30000 may be implemented as a cellular phone, a smart phone, a tablet PC, a personal digital assistant (PDA), or a wireless communication device. The memory system 30000 may include a memory device 2200 and a memory controller 2100 capable of controlling an operation of the memory device 2200. The memory device 2200 shown in FIG. 16 may correspond to the memory device 2200 shown in FIGS. 1 to 3. The memory controller 2100 shown in FIG. 16 may correspond to the memory controller 2100 shown in FIGS. 1 to 3.

The memory controller 2100 may control a data access operation of the memory device 2200, e.g., a program operation, an erase operation, a read operation, or the like under the control of a processor 3100.

Data programmed in the memory device 2200 may be output through a display 3200 under the control of the memory controller 2100.

A radio transceiver 3300 may transmit/receive radio signals through an antenna ANT. For example, the radio transceiver 3300 may convert a radio signal received through the antenna ANT into a signal that may be processed by the processor 3100. Therefore, the processor 3100 may process a signal output from the radio transceiver 3300 and transmit the processed signal to the memory controller 2100 or the display 3200. The memory controller 2100 may transmit the signal processed by the processor 3100 to the memory device 2200. Also, the radio transceiver 3300 may convert a signal output from the processor 3100 into a radio signal, and output the converted radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the memory controller 2100, data output from the radio transceiver 3300, or data output from the input device 3400 may be output through the display 3200.

In some embodiments, the memory controller 2100 capable of controlling an operation of the memory device 2200 may be implemented as a part of the processor 3100, or be implemented as a chip separate from the processor 3100.

Figure 17:
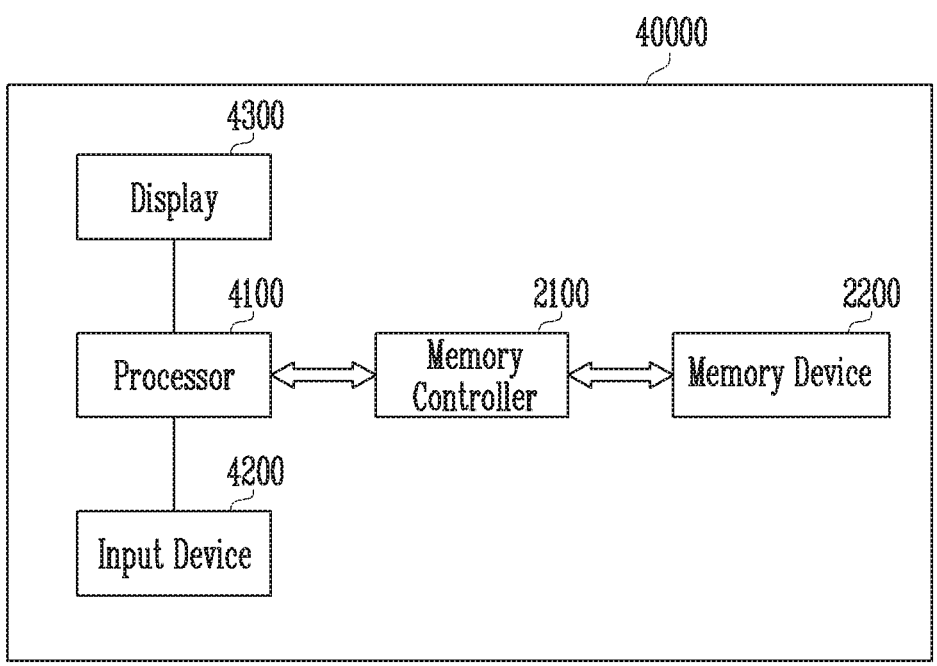

FIG. 17 is a diagram illustrating another example of the memory system including the memory controller shown in FIGS. 1 to 3.

Referring to FIG. 17, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a memory device 2200 and a memory controller 2100 capable of controlling a data processing operation of the memory device 2200. The memory device 2200 shown in FIG. 17 may correspond to the memory device 2200 shown in FIGS. 1 to 3. The memory controller 2100 shown in FIG. 17 may correspond to the memory controller 2100 shown in FIGS. 1 to 3.

A processor 4100 may output data stored in the memory device 2200 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 2100. In some embodiments, the memory controller 2100 capable of controlling an operation of the memory device 2200 may be implemented as a part of the processor 4100, or be implemented as a chip separate from the processor 4100.

Figure 18:
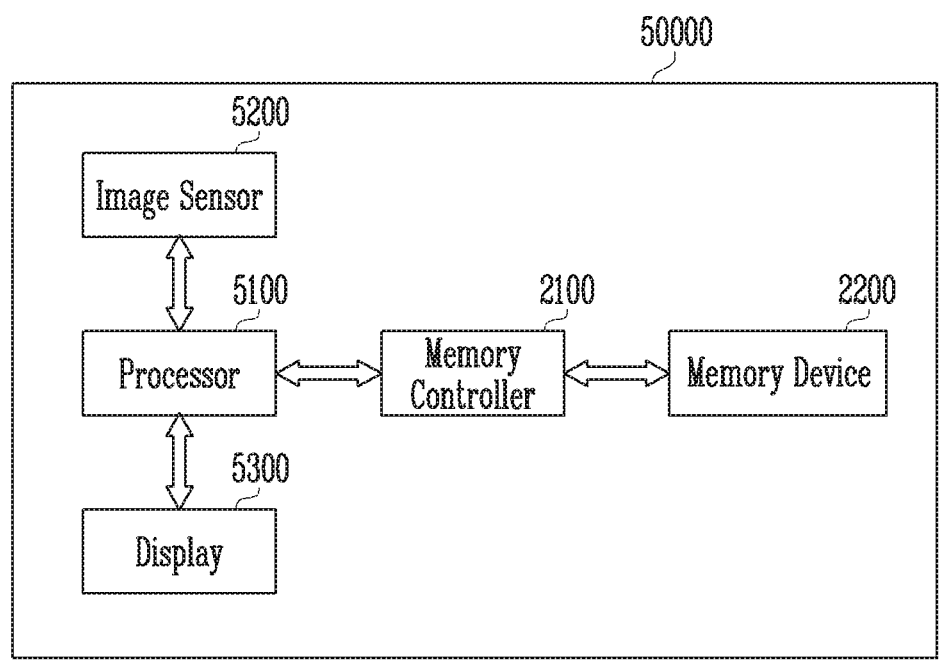

FIG. 18 is a diagram illustrating another example of the memory system including the memory controller shown in FIGS. 1 to 3.

Referring to FIG. 18, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a memory device 2200 and a memory controller 2100 capable of controlling a data processing operation of the memory device 2200, e.g., a program operation, an erase operation, or a read operation. The memory device 2200 shown in FIG. 18 may correspond to the memory device 2200 shown in FIGS. 1 to 3. The memory controller 2100 shown in FIG. 18 may correspond to the memory controller 2100 shown in FIGS. 1 to 3.

An image sensor 5200 of the memory system 50000 may convert an optical image into digital signals, and the converted digital signals may be transmitted to a processor 5100 or the memory controller 2100. Under the control of the processor 5100, the converted digital signals may be output through a display 5300, or be stored in the memory device 2200 through the memory controller 2100. In addition, data stored in the memory device 2200 may be output through the display 5300 under the control of the processor 5100 or the memory controller 2100.

In some embodiments, the memory controller 2100 capable of controlling an operation of the memory device 2200 may be implemented as a part of the processor 5100, or be implemented as a chip separate from the processor 5100.

Figure 19:
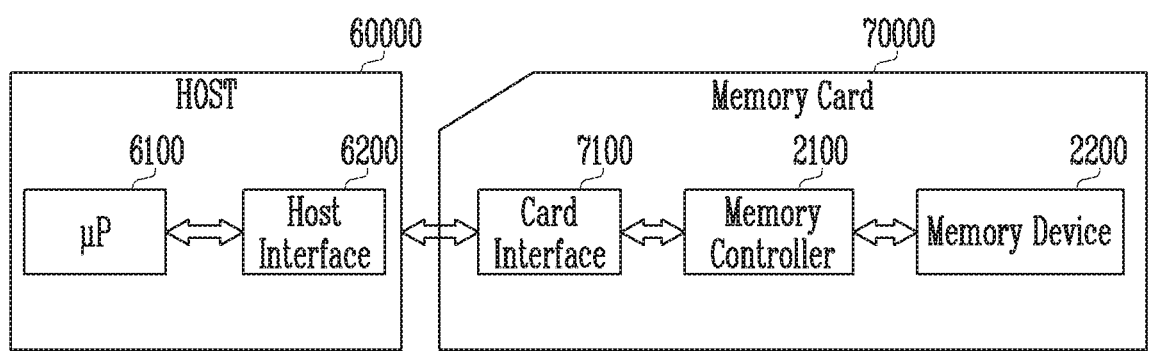

FIG. 19 is a diagram illustrating another example of the memory system including the memory controller shown in FIGS. 1 to 3.

Referring to FIG. 19, the memory system 70000 may be implemented as a memory card or a smart card. The memory system 70000 may include a memory device 2200, a memory controller 2100, and a card interface 7100. The memory device 2200 shown in FIG. 19 may correspond to the memory device 2200 shown in FIGS. 1 to 3. The memory controller 2100 shown in FIG. 19 may correspond to the memory controller 2100 shown in FIGS. 1 to 3.

The memory controller 2100 may control data exchange between the memory device 2200 and the card interface 7100. In some embodiments, the card interface 7100 may be a Secure Digital (SD) card interface or a Multi-Media Card (MMC) interface, but the present disclosure is not limited thereto.

The card interface 7100 may interface data exchange between a host 60000 and the memory controller 2100 according to a protocol of the host 60000. In some embodiments, the card interface 7100 may support a Universal Serial Bus (USB) protocol and an Inter-Chip (IC)-USB protocol. The card interface 7100 may mean hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the memory device 2200 through the card interface 7100 and the memory controller 2100 under the control of a microprocessor (μP) 6100.

In accordance with embodiments of the present disclosure, a reference value for a read reclaim operation is counted to limit performance of the read reclaim operation so that it is not excessively or too frequently performed. Thus, the performance of the memory system may be improved.

Various embodiments have been disclosed herein, and although specific terms are employed, they are used and are to be interpreted in a generic and descriptive sense and not for purpose of limitation. In some instances, as would be apparent to one skilled in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A method for operating a memory controller, the method comprising:

allocating a plurality of unit areas in a super block;

allocating each N bits among K bits to calculate a read count for each of the plurality of unit areas, wherein N and K are natural numbers;

allocating one or more bits among remaining bits of the K bits to calculate the read count of the super block;

counting a number of read accesses to each of the plurality of unit areas up to a first threshold value; and counting a number of read accesses to the super block up to a second threshold value, wherein a read count of the super block increases when a read count of any one-unit area among the plurality of unit areas reaches the first threshold value, and wherein N is determined such that multiplication of the first threshold value and the second threshold value is a target count value.

2. The method of claim 1, further comprising, when multiple values of N are determined, selecting a largest N.

3. The method of claim 1, further comprising:
performing a read reclaim operation when the read count of the super block reaches the second threshold value.

4. The method of claim 1, further comprising initializing the read count of any one-unit area.

5. The method of claim 1, wherein the first threshold value increases as an erase number of the super block increases, and wherein the second threshold value decreases as the erase number of the super block increases.

6. The method of claim 1, wherein a number of the plurality of unit areas is determined based on whether the super block stores sequential data or random data.

7. A memory controller for controlling a memory device including a super block including a plurality of unit areas, the memory controller comprising:
a plurality of first counters configured to count, up to a first threshold value, a number of read accesses to each of the plurality of unit areas in the super block;
a second counter configured to count, up to a second threshold value, a number of read accesses to the super block; and
a register allocator configured to allocate each N bits among K bits to each of the plurality of the first counters, wherein N and K are natural numbers, and to allocate one or more bits among remaining bits of the K bits to the second counter,
wherein the second counter increases a read count of the super block when a read count of any one-unit area among the plurality of unit areas reaches the first threshold value.

8. The memory controller of claim 7, wherein the register allocator selects N such that multiplication of the first threshold value and the second threshold value is a target count value.

9. The memory controller of claim 8, wherein the register allocator selects a largest N when multiple values of N are determined.

10. The memory controller of claim 7, wherein the register allocator selects N according to an erase number of the super block.

11. The memory controller of claim 10, wherein, as the erase number of the super block increases, the register allocator increases the first threshold value and decreases the second threshold value.

12. The memory controller of claim 7, wherein the first threshold value is less than or equal to a maximum value countable using the N bits.

13. The memory controller of claim 7, wherein the second threshold value is less than or equal to a maximum value countable using the one or more bits.

14. The memory controller of claim 7, further comprising a command generator configured to provide a command for a read reclaim operation to a memory device when the read count of the super block reaches the second threshold value.

15. The memory controller of claim 7, wherein each of the plurality of first counters initializes its read count when its read count reaches the first threshold value.

16. The memory controller of claim 7, wherein the register allocator sets a number of the plurality of unit areas based on whether the super block stores sequential data or random data.

17. The memory controller of claim 16, wherein, when the super block stores the random data, the register allocator increases the number of the plurality of unit areas greater than when the super block stores the sequential data.

18. A memory system comprising:
a memory device including a super block including a plurality of unit areas; and
a memory controller configured to:
allocate each N bits among K bits to calculate a read count for each of the plurality of unit areas, wherein N and K are natural numbers,
allocate one or more bits among remaining bits of the K bits to calculate the read count of the super block,
count a number of read accesses to each of the plurality of unit areas,
increase a total count value when each read count corresponding to each of the plurality of unit areas reaches a first threshold value, and
provide a command for a read reclaim operation to the memory device when the total count value reaches a second threshold value.

* * * * *